United States Patent [19]
Ishikura et al.

[11] Patent Number: 5,721,001
[45] Date of Patent: Feb. 24, 1998

[54] FRIED FOOD PRODUCING METHOD AND APPARATUS THEREFOR

[75] Inventors: Masaaki Ishikura, Kashiwa; Yoshiharu Sakai, Ikoma; Kenzo Masutani; Yasuo Saito, both of Osaka, all of Japan

[73] Assignee: Hisaka Works Limited, Osaka, Japan

[21] Appl. No.: 464,859

[22] PCT Filed: Oct. 11, 1994

[86] PCT No.: PCT/JP94/01697

§ 371 Date: Oct. 5, 1995

§ 102(e) Date: Oct. 5, 1995

[87] PCT Pub. No.: WO95/12989

PCT Pub. Date: May 18, 1995

[30] Foreign Application Priority Data

| Nov. 10, 1993 | [JP] | Japan | 5-280809 |
| Nov. 10, 1993 | [JP] | Japan | 5-280810 |
| Nov. 10, 1993 | [JP] | Japan | 5-280811 |
| Nov. 10, 1993 | [JP] | Japan | 5-280812 |
| Nov. 10, 1993 | [JP] | Japan | 5-280813 |

[51] Int. Cl.$^6$ .................................................. A23L 1/01
[52] U.S. Cl. ................ 426/438; 426/523; 99/330; 99/407; 99/410
[58] Field of Search .................. 426/302, 438, 426/523; 99/330, 407, 410

[56] References Cited

U.S. PATENT DOCUMENTS

| 2,827,379 | 3/1958 | Phelan | 99/330 X |
| 3,431,834 | 3/1969 | Keathley et al. | 99/330 X |
| 3,455,232 | 7/1969 | Oliver, Jr. | 99/407 |
| 3,466,997 | 9/1969 | Hartzog | 99/407 X |
| 3,613,550 | 10/1971 | Thompson | 99/330 |
| 4,047,476 | 9/1977 | Liebermann | 99/330 X |
| 4,064,796 | 12/1977 | Jones | 99/330 |
| 4,457,947 | 7/1984 | Schmidt et al. | 426/438 |
| 5,066,505 | 11/1991 | Vos et al. | 426/438 |
| 5,097,752 | 3/1992 | Kung | 99/410 X |
| 5,279,212 | 1/1994 | Coupe | 99/330 |

FOREIGN PATENT DOCUMENTS

| 51-31824 | 3/1976 | Japan. |
| 58-11865 | 1/1983 | Japan. |
| 58-19174 | 2/1983 | Japan. |
| 60-87682 | 5/1985 | Japan. |
| 1-185181 | 7/1987 | Japan. |

*Primary Examiner*—Milton Cano
*Attorney, Agent, or Firm*—Nikaido, Marmelstein, Murray & Oram LLP

[57] ABSTRACT

An object of the present invention is to mass-produce fried food of high quality having no unevenly fried spots by making uniform the amount of cooking oil for frying food fed to food and the temperature distribution of the oil. A plurality of stacked pan-like trays (10) are received in a closable processing tank (1) and heated cooking oil is rapidly fed into the trays (10) through the side wall thereof by oil feed nozzles (41) so that the oil flows on the bottoms of the trays (10) at a given flow rate, the excess oil being allowed to overflow from the side opposite to the oil feed side to flow downwardly of the trays (10). The stacked trays (10) are individually fed with oil by the oil feed nozzles (41) so that none of the oil flowing from upper trays enters lower trays. The oil feed nozzles (41) are slidable back and forth relative to the trays (10), and the processing tank (1) is pressurized or evacuated according to the cooking conditions for articles of food a. The oil which has flowed down from the stacked trays (10) to the bottom of the processing tank (1) is purified outside the processing tank (1) for reuse.

17 Claims, 22 Drawing Sheets

FRIED FOOD PRODUCING METHOD AND APPARATUS THEREFOR

BACKGROUND OF THE INVENTION

1. Technical Field

The present invention relates to a fried food producing method and an apparatus therefor, wherein fried food such as fried chicken, croquettes, pork cutlets, and tempura are prepared using cooking oil or fat (hereinafter referred to simply as cooking oil).

2. Description of Prior Art

When fried food such as fried chicken, croquettes, pork cutlets, and tempura are commercially prepared by food producers or meal suppliers or in restaurants, use is made of a cooking utensil for business use called the fryer. The fryer comprises a heating device such as an electric or gas heater integrally installed in a pot-like processing tank. It is arranged that the cooking oil put in the processing tank is heated for convection in the processing tank. In producing fried food by such fryer, a cooking method called the deep frying method is commonly used. The deep frying method cooks food by heating oil put in the processing tank to 130° C. to 220° C., immersing food in the heated oil, and transmitting heat to the food by the convecting oil. The fryers used by food producers are classified into fryers on automatic control system capable of automatically controlling the oil temperature and cooking time, continuous fryers for continuously cooking food on a belt conveyor, and pressure fryers for cooking food under a given pressure.

According to said fryers, the pot-like processing tank is formed large enough to hold a large amount of food at a time immersed in oil: therefore, a sufficiently large amount of oil to ensure convection has to be put in, the amount of oil to be used being very large. In the case of frying food, when the same oil is used several times, impurities such as oil dregs appear in the oil, said impurities tending to adhere to the food or accelerating the fouling of the oil. Therefore, all oil has to be exchanged for fresh oil and disposed of in a short cycle after several times of cooking. As a result, the amount of disposal of oil is very large, increasing the cooking cost and also the cost for decomposing the large amount of waste oil.

With the above in mind, the present applicant has tried to produce fried food by making the processing tank in the form of a pan having a sufficient depth to immerse food in the oil so as to require a minimum amount of cooking oil, and heating the oil in the processing tank by a heating device. According to this trial, since the processing tank is in the form of a pan and is planar, the amount of oil to be used is greatly reduced. In the planar processing tank, however, the heat convection of the oil put therein does not take place so well, leading to a variation in the oil temperature in various regions in the processing tank, making it impossible to prepare good fried food in any region in the processing tank. Further, generally fryers have a heat source (heating device) in the center of the bottom of the processing tank, the cooing is faster in the vicinity of the heat source and slower in regions remote from the heat source; thus, the so-called unevenly fried spots tend to appear, a disadvantage that the cooking is not uniform.

To solve such problem, the present applicant has previously proposed a method of preparing fried food comprising the steps of stacking a plurality of pan-like cooking trays for receiving food without piling the latter, receiving the stack in a processing tank, spouting heated oil into the trays by spout nozzles disposed in the tank, and brining the oil into direct contact with the food in the trays (Japanese Patent Application No. 261285/91,) and a method of preparing fried food comprising the steps of stacking a plurality of pan-like cooking trays having food received therein as in the first mentioned method, receiving the stack in a processing tank, and allowing heated oil to flow down from oil outlet ports formed in the processing tank to the food in the trays (Japanese Patent Application No. 261286/91).

In each of the above methods, since the bottoms of the trays are formed of metal mesh material or formed with a number of through-holes, the heated cooking oil fed from the spout nozzle or oil outlet port and used in one of the stacked trays flows down to the tray thereunder through the metal mesh material or through-holes, which means that the amount which flows down is added to the amount of oil fed to the tray by the spout nozzles and oil outlet port. As a result, the amount of oil in each tray tends to be non-uniform depending on the downflow from an upper tray to a lower tray in the stack, resulting in a variation in the oil temperature, leading to unevenly fried spots; thus, there still remains the possibility that cooking does not become uniform. Further, upon completion of cooking, it takes time to discharge the oil from the trays, and there is a difference in time between upper and lower trays for the oil to discharge; thus, oil-cuttability (the property of oil that excess oil on fried food drains well rather than lingering long) is poor and the quality of the product lowers or varies.

SUMMARY OF THE INVENTION

With the above problems in mind, the present invention has been accomplished and is intended to provide a method of preparing fried food and an apparatus therefor, wherein the amount of oil to be fed to each of stacked trays is made uniform so as to minimize temperature variations of food to be cooked and unevenly fried spots.

To achieve said object, the present inventive method comprises the steps of receiving food in cooking trays disposed in a processing tank, rapidly charging the trays with heated cooking oil at a give flow rate to immerse the food in the oil, and rapidly discharging the oil from the trays upon passage of a predetermined period of immersion. The rapid discharge of oil from the trays can be easily attained by removing the oil feed nozzles form oil feed ports formed in the side walls of the trays, and using said oil feed ports as oil discharge ports.

Further, the present inventive apparatus comprises a closable processing tank, a pan-like food storing and cooking trays stacked and substantially horizontally disposed in the processing tank, nozzles respectively removable mounted on the trays and used to rapidly charging the trays with heated cooking oil at a given flow rate, and an oil feed device having a nozzle driving device for slidably supporting the oil feed nozzles and removably mounting them on the trays. This producing apparatus has added thereto various functions such as a function to increase or decreases the pressure in the processing tank in accordance with the proceeding of the cooking of food and a function to control the cooking conditions including the oil temperature.

Further, the pan-like trays used in the present apparatus comprise an oil feed port or oil feed groove formed in the side wall through which heated oil is fed in from the oil feed nozzle, and a weir or oil discharge port formed on the opposite side which it is intended for oil to overflow, the arrangement being such that oil is charged into the trays as it flows in one direction and the oil overflowing an upper tray flows down without entering a lower tray.

According to the present invention, since the food in the pan-like trays in the processing tank is fried with oil rapidly charged into the trays from the side at a given flow rate, the amount of oil required for cooking can be reduced to a great degree, making it possible to reduce the costs for disposal of waste oil and for preparing fried food. Further, since the oil charged into the trays at a given flow rate is used to fry food, the cooking temperature for food in the trays is made uniform, and the rapid discharging of waste oil through the opening in each tray ensures good oil-cuttability and hence the production of fried food of stabilized high quality.

Further, positioning the oil feed device laterally of the trays stacked in the processing tank provides a reduction in the size of the entire production apparatus including the processing tank. Further, the joint between the oil feed port in the lateral wall of a tray and the oil feed nozzle is made by using a spherical surface and taper surface, thereby ensuring firm fitting of the oil feed nozzle into the oil feed port. And the nozzle driving device for supporting the oil feed nozzles and moving them back and forth is provided with a displacement accommodating assembly such as a bellows, whereby even if a positional deviation takes place between the oil feed port in the tray and the oil feed nozzle, such positional deviation is accommodated to ensure accurate insertion of the oil feed nozzle in the oil feed port; thus, a stably operable, highly reliable, fried food producing apparatus can be provided.

Further, since the cooking conditions including the pressure in the closable processing tank and the oil temperature can be selectably set according to the kind of food, various foods can be fried under respective optimum cooking conditions; thus, a fried food producing apparatus for business use can be provided which is superior from the viewpoint of construction and cost.

Further, since the pan-like cooking tray is constructed to be fed with oil laterally thereof by the oil feed nozzle and to allow the oil to overflow the weir on the side opposite to the oil feed side, even if a plurality of such trays are stacked, the stack is not bulky but compact. Further, the tray is divided into a tray body and a support shelf disposed in the bottom of the tray body, so that the clearance between the tray body and the support shelf is utilized to achieve the distribution of oil over the entire tray body and the discharge of oil from the tray, thereby facilitating the rapid feeding and discharging of oil and the enhancement of quality of fried food.

Further, the baffle plate or guide element provided in the tray weir prevents oil flowing down from an upper tray from entering into a lower tray, serving to make uniform the cooking conditions in each tray, making it possible to attain the enhancement of uniform quality of fried food. Further, treating the tray bodies and support shelves with polytetrafluoroethylene (TEFLON) prevents food and oil from adhering thereto and simplifies cleaning thereof.

BRIEF DESCRIPTION OF THE DRAWINGS

FIG. 3 explains cooking trays in the processing tank of FIG. 2, wherein

FIG. 4 explains the cooking trays in the processing tank of FIG. 2, wherein

THE PREFERRED EMBODIMENTS OF THE INVENTION

Figure 1:
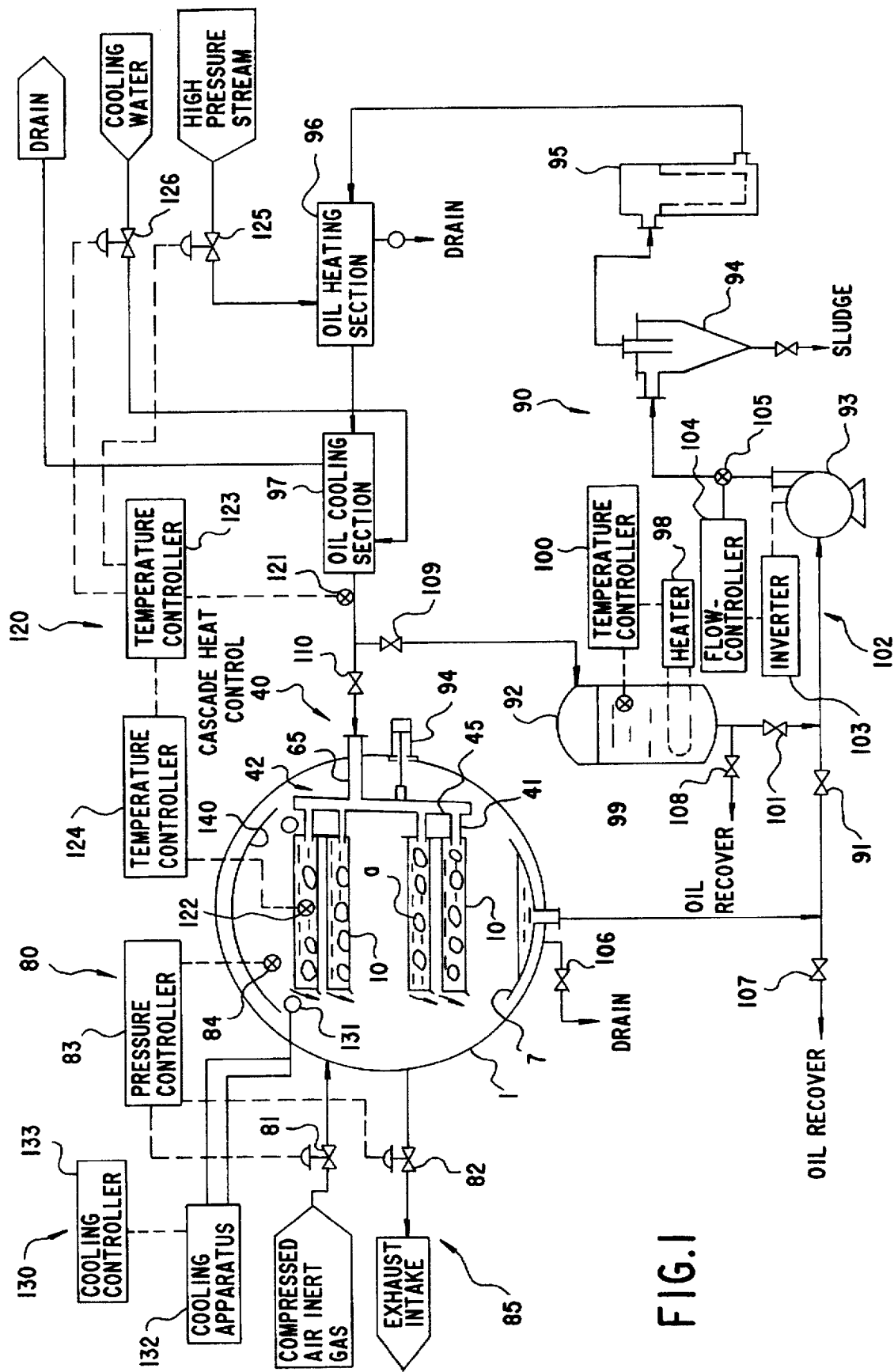
FIG. 1 is a schematic structural view showing an embodiment of a fried food producing apparatus according to the present invention.

Embodiments of the invention will now be described with reference to the drawings. In addition, throughout the figures, the same parts or the corresponding parts are denoted by the same reference characters to avoid a repetitive description.

Figure 2:
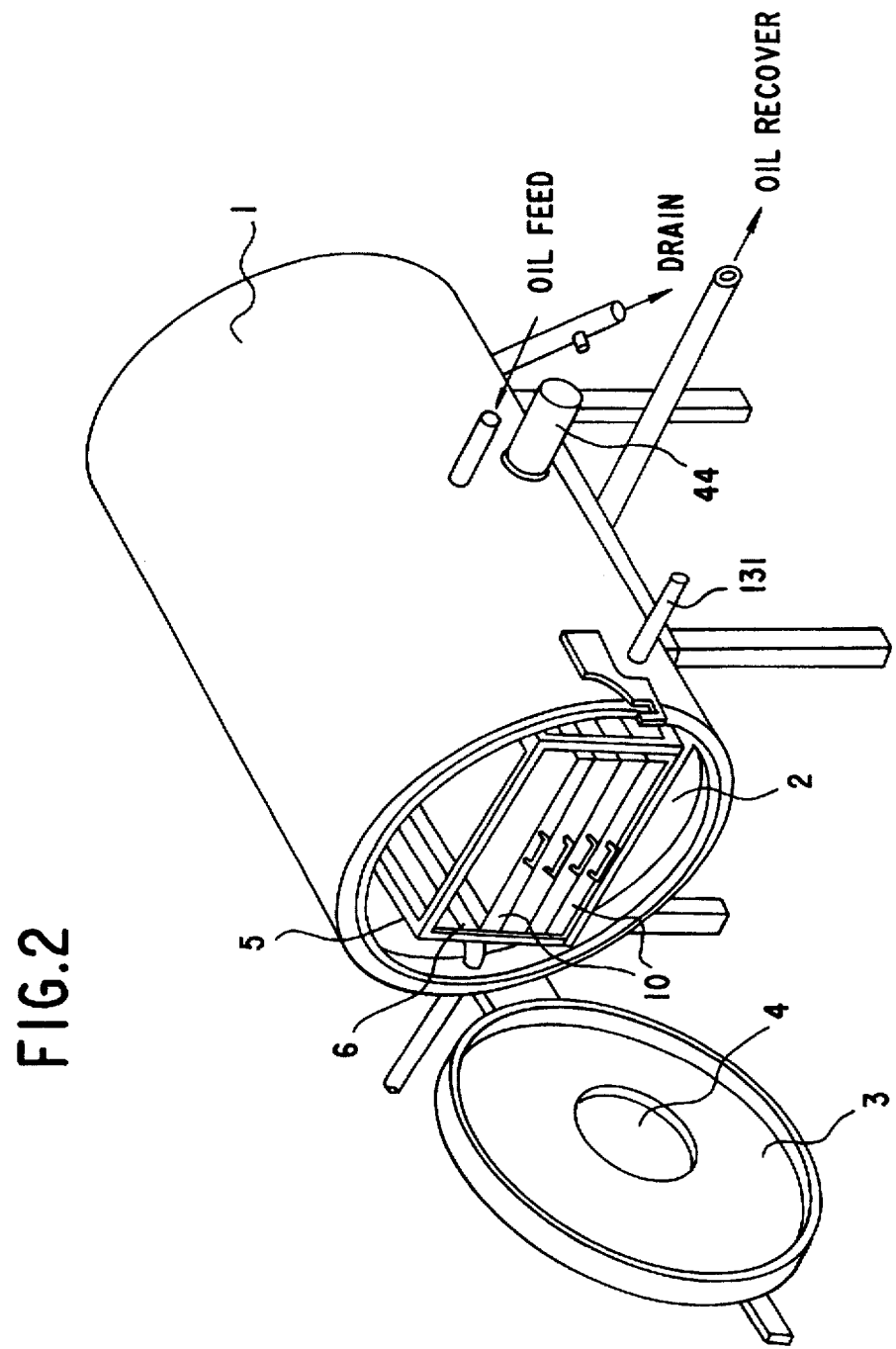
FIG. 2 is a perspective view of a processing tank in the producing apparatus of FIG. 1.

The fried food producing apparatus shown in FIG. 1 comprises a processing tank 1 in the form of a horizontal cylindrical chamber, and an oil feed device 40 attached to the processing tank 1. The processing tank 1, as shown in FIG. 2, has an inlet and outlet opening 2 in one side, said inlet and outlet opening 2 being closed by a cover 3 whereby the interior is hermetically closed. The abutting surfaces of the outlet and inlet opening 2 and the cover 3 are provided with heat-resistant pressure-resistant seals, so that the processing tank 1 is closed by closing the cover 3. The cover 3 is formed with a peep window 4 through which the cooking state in the processing tank 1 can be monitored. A support block 5 is installed in the processing tank 1 and is formed with a tray receiving space where a plurality of cooking trays 10 are stored stacked in a vertical row.

Figure 3A:
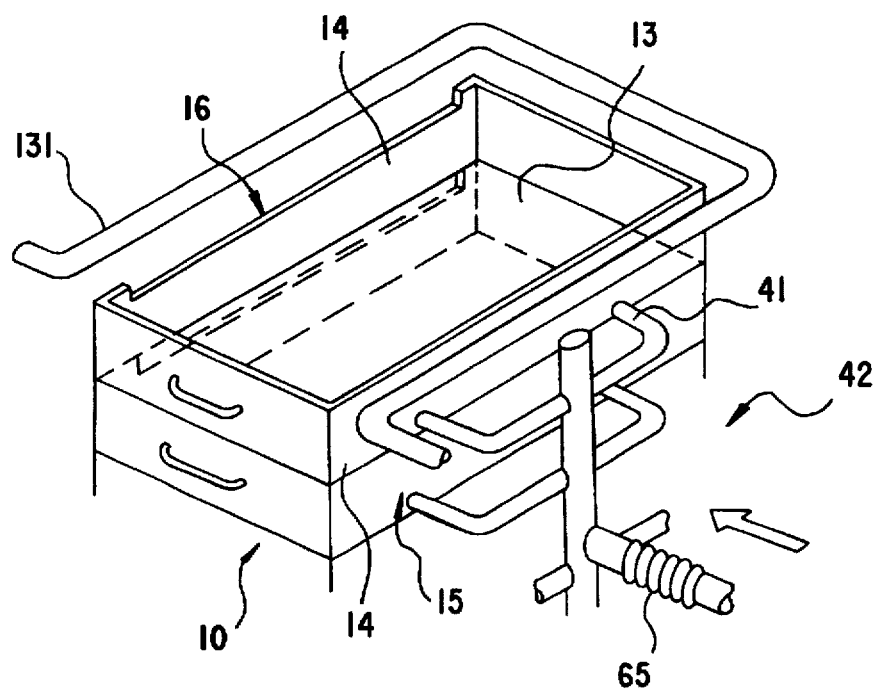
FIG. 3(a) is a perspective view showing oil feed nozzles inserted in the trays.

Such tray 10 is in the form of a pan for receiving articles of food a without piling them and an example thereof is shown in FIGS. 3(a) and (b), wherein a rectangular bottom 13 for supporting the articles of food a is formed with upright side walls 14 and the lower portion of one of the longer side walls 14 is formed with an oil feed ports 15, while the upper portion of the opposite side wall 14 is formed with a weir 16 which the cooking oil is allowed to overflow. The outer lower portion of the side wall 14 having said weir 16 is integrally formed with a baffle plate 17 slanting downward, said baffle plate 17 preventing the oil flowing down from an upper one of the stacked trays 10 from entering a lower tray.

Installed laterally of the trays 10 in the processing tank 1 are an oil feed nozzle 41 for an oil feed device 40 and a nozzle driving device 42 therefor. The oil feed nozzle 41 is adapted to be inserted into the oil feed ports 15 in each of the trays 10 stacked in the processing tank 1 to rapidly charge heated oil laterally into the tray at a given flow rate. The oil rapidly charged into each tray 10 cooks articles of food a and overflows. Upon completion of cooking, the oil feed nozzle 41 is separated from the oil feed ports 15 in each tray 10, so that the oil in the tray 10 is rapidly discharged through the oil feed ports 15 which have thus been opened.

In this manner oil at given flow rate is rapidly charged laterally into each of the trays 10 stacked in the processing tank 1, while allowing the oil to overflow on the other side. This arrangement save the need of convecting oil in the tray as in the conventional deep frying method, reducing the amount of oil required for cooking. Further, uniform amount of oil can be attained in each of the stacked trays 10, so that articles of food a can be fried at a uniform temperature, thereby reducing unevenly fried spots. Further, rapidly discharging the oil after the articles of food a have been immersed in the oil in the tray for a predetermined time improves the oil-cuttability, suppressing deterioration and variation of quality of the fried food. Such merit in the production of fried food is likewise attained in various trays in embodiments to be later described.

The nozzle driving device 42 for the oil feed device 40 shown in FIG. 1 has a header 45 for supporting the oil feed nozzles 41 and feeding oil. The header 45 is attached to the processing tank 1 through a bellows 65 to be later described and is moved back and forth laterally of the trays 10 by a slide device 44 fixed to the processing tank 1.

Figure 3B:
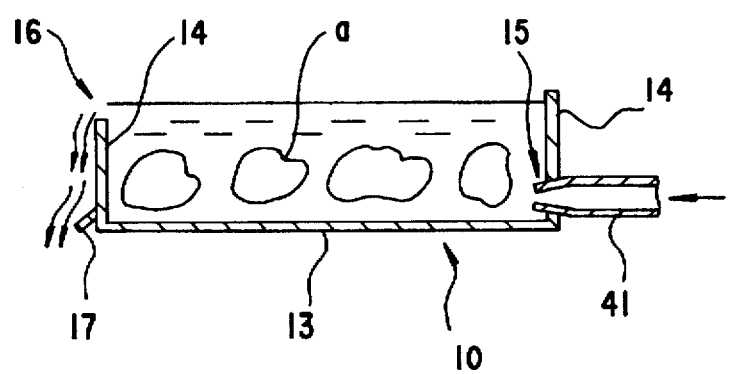
FIG. 3(b) is a partial sectional view of FIG. 3(a)
Figure 4A:
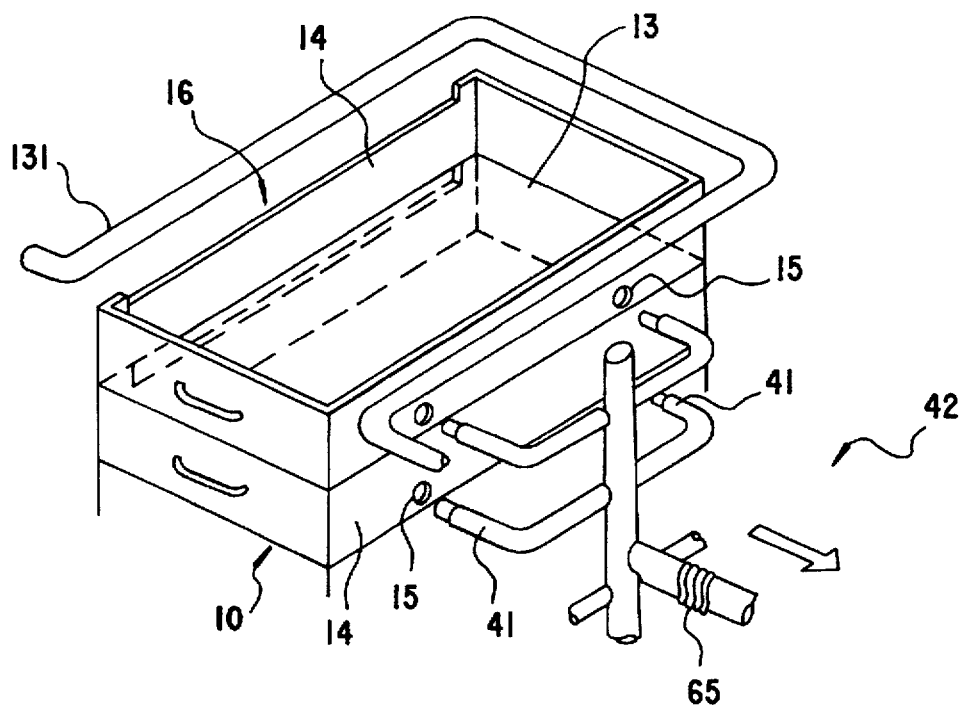
FIG 4(a) is a perspective view showing the oil feed nozzles removed form the trays.
Figure 4B:
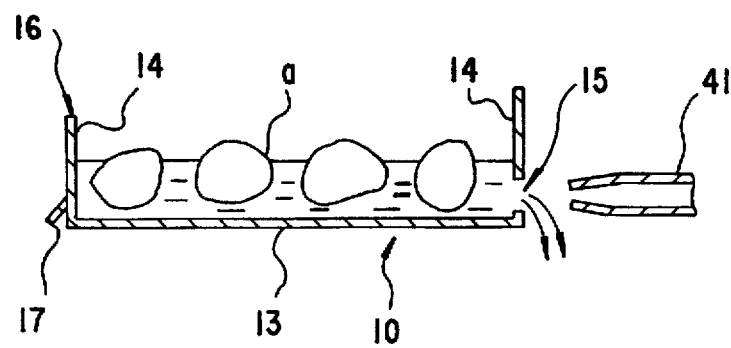
FIG. 4(b) is a partial sectional view of FIG. 4(a)

When the header 45 is advanced by the slide device 44, as shown in FIG. 3, the oil feed nozzles 41 are fitted in the oil feed ports 15 in the trays 10. In this state, oil is fed from the oil feed device 40 to the oil feed nozzles 41 and this oil is rapidly charged into the trays 10, so that the articles of food a in the trays 10 are immersed in the oil for cooking. The oil charged into the trays 10 and flowing at a given rate toward the side opposite to the oil feed side flows down as it overflows the weir 16. The oil flowing down on the outer surface of the weir 16 is forced by the baffle plate 17 to change its downflow course, thereby being prevented from entering a lower tray; this eliminates the fear of the cooking conditions in the lower tray being changed.

When the cooking is completed as the articles of food a are immersed in the oil in the trays 10 for a predetermined time, the feeding of oil to the oil feed nozzles 41 is stopped, whereupon the slide device 44 retracts the header 45. This retraction, as shown in FIGS. at(a) and (b), results in the oil feed nozzles 41 being separated from the oil feed ports 15 in the trays 10, with the oil feed ports 15 being opened to serve as oil discharge ports, through which the oil in the trays 10 is rapidly discharged. The oil flowing down from each tray 10 is recovered by a recovering tray 7 installed on the bottom of the processing tank 1 and is discharged outside the processing tank 1.

The processing tank 1 has attached thereto, besides the oil feed device 40, structural means for setting the cooking conditions according to the kind of food, if need arises, and this will be described prior to description of concrete examples of the oil feed device 40.

As shown in FIG. 1, the processing tank 1 has attached thereto pressure adjusting means 80 for setting the pressure in the processing tank 1 at increased or decreased value. The pressure adjusting means 80 enables pressurized air to be fed into the closed processing tank 1, the adjustment of the feeding of pressurized air being effected by adjusting an air feed valve 81. Further, the pressure adjusting means 80 enables the air in the processing tank 1 in pressurized or evacuated state to be discharged or sucked and the suction and discharge adjustment of the pressurized air in the tank is effected by the opening and closing adjustment of a suction and discharging valve 82. The opening and closing control of the air feed valve 81 and suction or discharge valve 82 is effected by a pressure controller 83, which operates on the basis of detection signals from a pressure sensor 84 to effect the opening and controlling control of the air feed valve 81 or suction and discharge valve 82 to provide a predetermined set pressure in the processing tank 1.

The pressure in the processing tank 1 is controlled to vary according to articles of food a, and usually, during cooking the pressure is controlled to provide a pressure of less than 3 atmospheres which is considered proper. Further, after cooking, the processing tank 1 is temporarily evacuated, whereby the oil-cutting for the fried food smoothly takes place, so that the fried food can be prepared crisp. The fried food for which oil-cutting has been smoothly effected tastes good and is considered healthy and besides being superior in handling for packaging, it is free from tackiness in the case where it is frozen; it provides a high quality product.

Further, gas feed means 85 for feeding a predetermined gas into the processing tank 1 is attached to the processing tank 1. Generally, oil heated during cooking tends to be oxidized more easily as its temperature increases. Therefore, the gas feed means 85 feeds an inert gas such as nitrogen or carbon dioxide into the processing tank 1 at predetermined period starting from the preparatory stage for cooking; there are two methods, one for feeding compressed gas into the processing tank 1, and the other for evacuating the processing tank 1 to seal a gas therein. An inert gas is fed into the processing tank 1 when the temperature in the processing tank 1 is more or less elevated, whereby oxidation of the oil is substantially prevented and in the case where the fried food is allowed to stay in the processing tank 1 for some time, the oxidation of the fried food is also prevented.

Oil circulating means 90 is attached to the oil feed device 40 of the processing tank 1. The oil circulating means 90 comprises an oil storage tank 92 connected to the interior of the processing tank 1 through a valve 91, a pump 93, a cyclone 94, a strainer 95, an oil heating section 96, and an oil cooling section 97. The oil stored in the oil storage tank 92 is heated to a predetermined temperature by a heater 98. The heater 98 is controlled by a temperature controller 100 on the basis of detection signals from a temperature sensor 99 disposed in the oil storage tank 92. The oil fed from the oil storage tank 92 is fed to a pump 93 through a valve 101, and then to the cyclone 94 by the pump 93 having oil feed flow rate control means 102.

The oil feed flow rate control means 102 comprises an inverter 103, a flow rate controller 104, and a flow rate sensor 105, the arrangement being such that the flow controller 104 controls the inverter 103 on the basis of detection signals from the flow rate sensor 105 to operate the pump 93 at a predetermined flow rate. The oil from this pump 93 is fed through the cyclone 94 and strainer 95, which are purifying means, to the oil heating section 96. The cyclone 94 removes larger foreign matter, such as fried dough fragments, contained in the oil, while the strainer 95 removes the remaining smaller foreign matter, such as dregs. The oil heating section 96 heats the oil fed to the oil feed device 40 by high pressure steam, and the oil cooling section 96 once cools to a predetermined temperature the oil heated in the oil heating section 96 by the feeding and discharging of cooling water.

Further, the oil circulating means 90 shown in FIG. 1 comprises a drain valve 106, oil recovery valves 107 and 108, a bypass valve 109, and a feed valve 110. The drain valve 106 is used to discharge the condenses water which is stored in the processing tank 1 as will be later described, and the oil recovery valves 107 and 108 are used to discharge the oil in the processing tank 1 and oil storage tank 92 in cleaning and inspecting the processing tank 1 and oil storage tank 92. Further, the bypass valve 109 is used to recover the oil from the oil cooling section 96 to the oil storage tank 92 upon completion of cooking, and the feed valve 110 is sued to feed the oil fed under pressure from the oil cooling section 96 to the oil feed nozzles 41 of the header 45 of the oil feed device 40.

Further, the processing tank 1 has oil temperature adjusting means 120 attached thereto. The oil temperature adjusting means 120 comprises a first temperature sensor 121 disposed on the output side of the oil cooling section 97, a second temperature sensor 122 disposed at an oil charge position in the tray, and first and second temperature controllers 123 and 124 which effect cascade temperature adjustment on the basis of the detection signals from the first and second temperature sensors 121 and 122, thereby controlling the opening and closing of the air feed valve 125 of the oil heating section 96 and the water feed valve 126 of the oil cooling section 97. That is, the temperature of the oil fed from the oil cooling section 96 into the processing tank 1 is detected by the first temperature sensor 121, while the temperature of the oil charged into the tray 10 is detected by the second sensor 122. The first and second temperature controllers 123 and 124 effect cascade adjustment on the basis of detection signals from the first and second temperature sensors 121 and 122 to control the opening and closing of the air feed valve 125 and water feed valve 126 to adjust the oil temperature in the oil heating section 96 or oil cooling section 97, thereby setting the temperature of the oil in the trays 10 in the processing tank 1 at a predetermined temperature.

Further, the processing tank 1 has also attached thereto cooling means 130 for discharging the water vapor in the processing tank 1, and a condensed water separating mechanism 140 for discharging the condensed water in the processing tank 1. The cooling means 130 comprises a cooling pipe 131 disposed to surround the upper portion of the support block 5 in the processing tank 1, and a cooling device 132 for circulating cooling water in the cooling pipe 131. The cooling device 132 is controlled by the cooling controller 133 to circulate cooling water in the cooling pipe 131 when articles of food a in the trays 10 in the processing tank 1 are heated in the fried state. When cooling water is circulated in the cooling pipe 131, water vapor filling the processing tank 1 condenses on the surface of the cooling pipe 131 as dewdrops, which fall to the bottom of the processing tank 1. The condensed water separating mechanism 140 is, for example, in the form of a inverted gutter-like plate extending along the top surface of the processing tank 1, serving to prevent the condensed water adhering to the wall surface of the processing tank 1 from dripping into the trays 10. The water dropping from the cooling pie 131 and the condensed water separating mechanism 140 is recovered by the recovering tray 7 on the bottom of the processing tank 1 and is discharged out of the processing tank 1 by opening the drain valve 106.

Generally, when fried food is left in a closed container, the fried food, particularly its dough portion absorbs condensed water and hydrolysis takes place between the absorbed water and the oil, sometimes greatly shortening the life of the product. However, if the cooling pipe 131 and condensed water separating mechanism 140 are disposed in the processing tank 1, as described above, to thereby forcibly remove the water vapor and condensed water in the processing tank 1, this makes it possible to prevent superfluous water from adhering to the fried food in the trays 10 and prevent it from entering the oil in the trays 10. Thus, enhancement of the quality of fried food and prolongation of the life of oil can be attained.

In the aforesaid tank attached component means, the pressure controller 83, temperature controllers 100, 123 and 124, flow rate controller 104, and cooling controller 133 are housed in a microcomputer. An example of operating system of such microcomputer is shown in a block diagram in FIG.

5. A memory 150 in FIG. 5 has inputted thereinto in advance cooking conditions to be sent to the controllers 83, 100, 123, 124, 104, and 133. As such cooking conditions, preferred conditions for respective foods to be cooked, such as for fried chicken, croquettes, and port cutlets, are inputted. Particularly, there are inputted heating conditions and pressurizing or evacuating conditions allotted to respective time bands included in the total cooking time for each food to be cooked.

Figure 5:
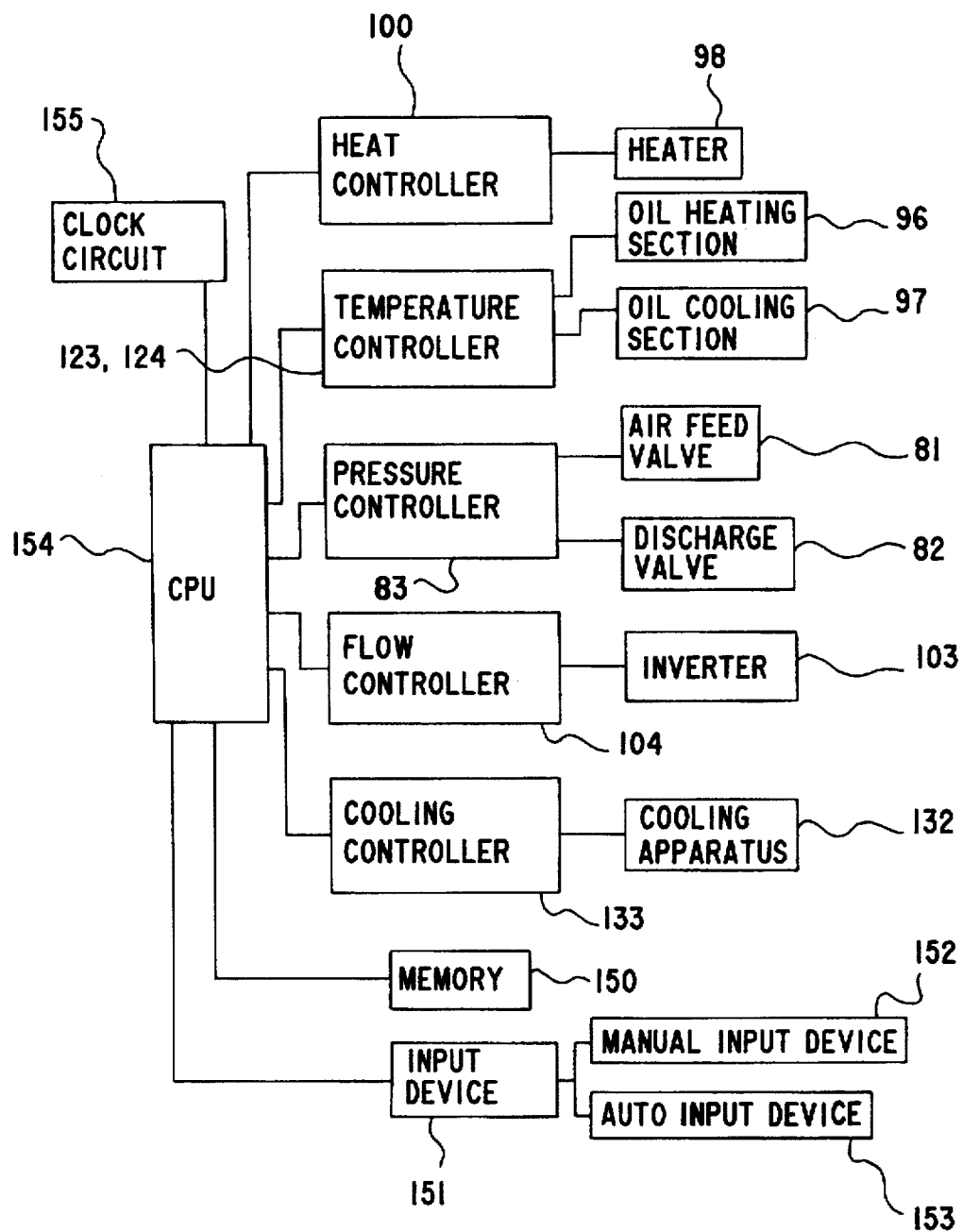
FIG. 5 is a block diagram showing a control system for each controller in the producing apparatus of FIG. 1.

The input device 151 in FIG. 5, is comprised of a manual input device 152 and an automatic input device 153. The manual input device 152 designates independent cooking conditions with respect to the controllers 83, 100, 123, 124, 104, and 133 and inputs thereinto, while the automatic input device 153 allows cooking to start under the cooking conditions inputted in advance into the memory 150, it being arranged that, for example, in the case of starting preparation of fried chickens, the corresponding input switch will be turned on.

At the same time as a command signal to start cooking is inputted into the CPU (central processing unit) 154 in FIG. 5 from the input device 151, the present time is inputted into the CPU from a clock circuit 155, and said time is stored as the cooking start time and displayed on a display board. In the case where the command signal delivered from the input device 151 is a command signal based on the operation of the manual input device, it is arranged that the CPU 154 delivers corresponding control signals based on the instructed cooking conditions inputted thereinto to the controllers 83, 100, 123, 124, 104, and 133. In the case where the command signal delivered from the input device 151 is based on the operation of the automatic input device 153, the cooking conditions for the food designated by the command are outputted from the memory 150 into the CPU 154. For example, if an input switch in the automatic input device 153 corresponding to fried chickens is turned on, then on the basis of this command the cooking conditions for fried chickens are outputted from the memory 150 into the CPU 154.

The CPU 154 outputs the cooking conditions to the controllers 83, 100, 123, 124, 104, and 133, and the controllers 83, 100, 123, 124, 104, and 133 control the operations of the individual section on the inputted cooking conditions. Controlling the cooking of fried food by a microcomputer in this manner facilitates and accelerates the cooking of food under optimum cooking conditions (pressurization and evacuation, etc.) corresponding to the respective characteristics of foods.

Concrete examples of the various trays 10 to be installed in the processing tank 1 and the oil feed device 40 corresponding thereto will now be described.

FIGS. 6 through 14 show concrete examples of trays 10 having oil feed ports on two sides, and FIGS. 15 through 20 show concrete examples of the oil feed device 40 corresponding to said trays 10. In addition, the oil feed device 40 shown in FIG. 1 is installed on one side only, correspondingly to the trays 10 having oil feed ports 15 in one side only, while in FIG. 15 a pair of oil feed devices 40 are installed on opposite sides, corresponding to the trays 10 having oil feed ports 15 on opposite sides. The oil feed devices 40 shown in these FIGS. 1 and 15 and in FIG. 34 to be later described are basically of the same construction, and one concrete example will be described with reference to FIGS. 15 through 20 after the tray 10 shown in FIG. 6.

Figure 6:
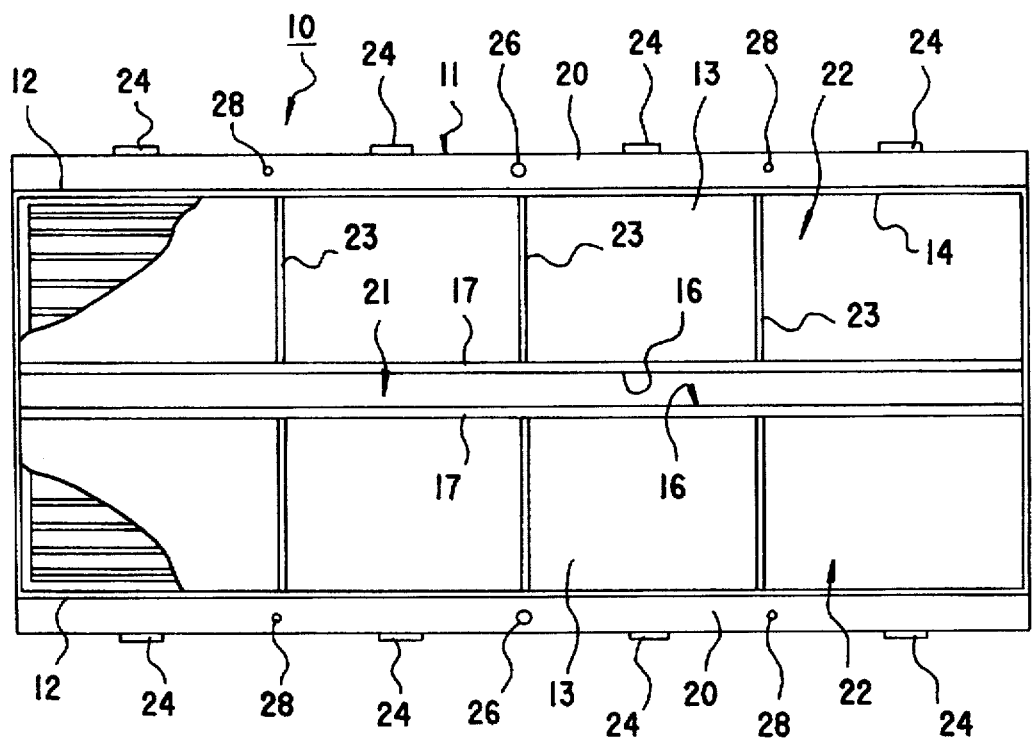
FIG. 6 is a plan view showing an embodiment of a tray for producing fried food according to the invention.
Figure 7:
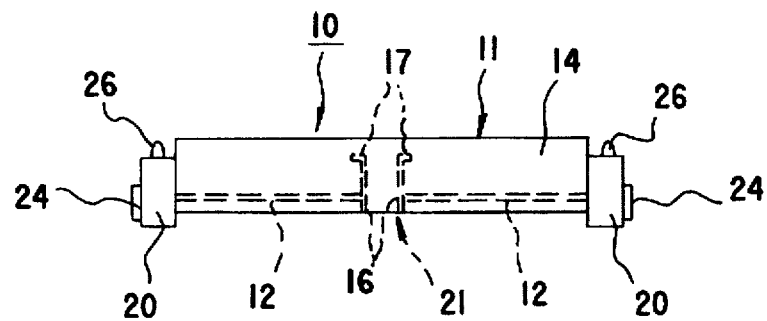
FIG. 7 is a side view of the tray of FIG. 6.
Figure 10:
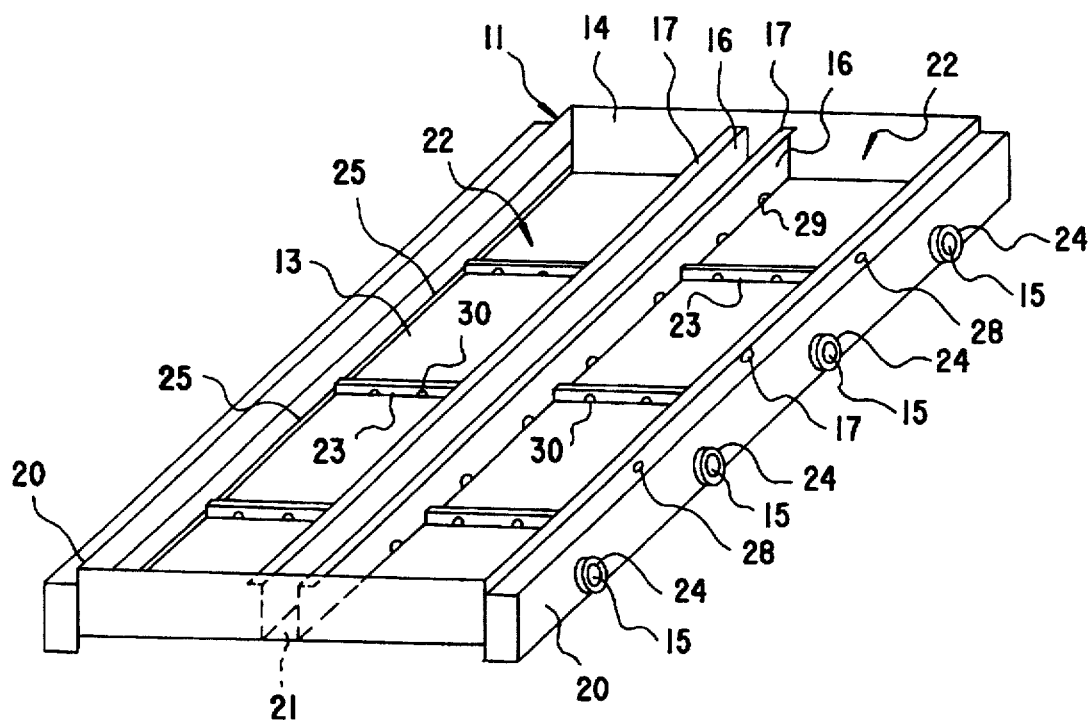
FIG. 10 is a perspective view of a tray body in the tray of FIG. 6.

The tray 10 shown in FIG. 6 comprises a tray body 11 and a support shelves 12 mounted in the tray body 11. The tray body 11 is in the form of a top-opened rectangular pan as shown in FIG. 10, having a side wall 14 around the peripheral edge of the rectangular bottom 13, with square sleeve-like pipe 20 integrally attached to the longer sides with a level difference defined as shown. An oil discharge hole 21 is formed in the middle of the bottom 13 to extend along the longer sides, with weirs 16 erected on opposite sides of the oil discharge hole 21 to extend from the bottom 13 so that oil overflows the weirs 16, and with receiving spaces 22 defined on both sides of the weirs 16 for receiving food. The weirs 16 are somewhat lower in level than the side wall 14 and are of such height that articles of food placed on the support shelves 12 without piling each other are immersed in oil, excess oil being allowed to overflow the weirs 16 to flow down the oil discharge hole 21 until it is discharged. The upper ends of the weirs 16 are formed with baffle plates 17 to prevent oil flowing down from above from entering the receiving spaces 22. The baffle plates 17 extend horizontally from the upper ends of the weirs 16 toward the receiving spaces 22.

Figure 8:
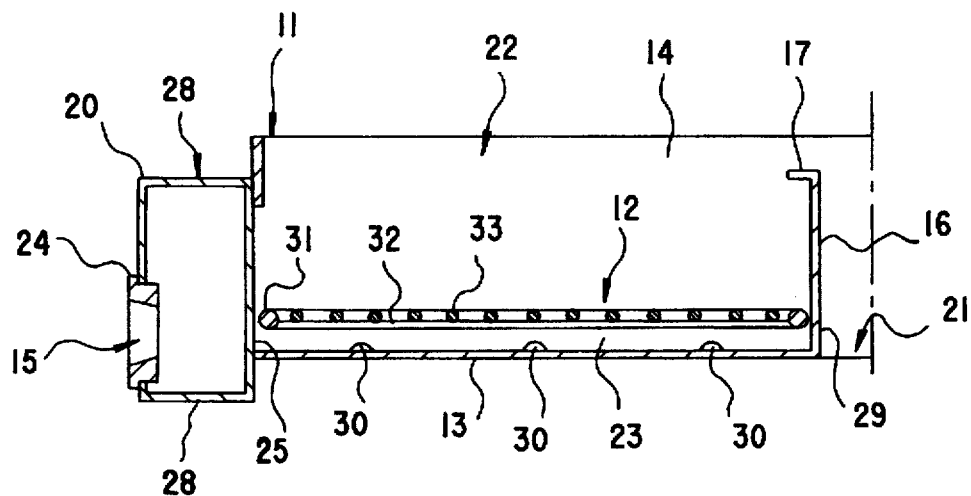
FIG. 8 is a partial enlarged sectional view of the tray of FIG. 6.
Figure 9:
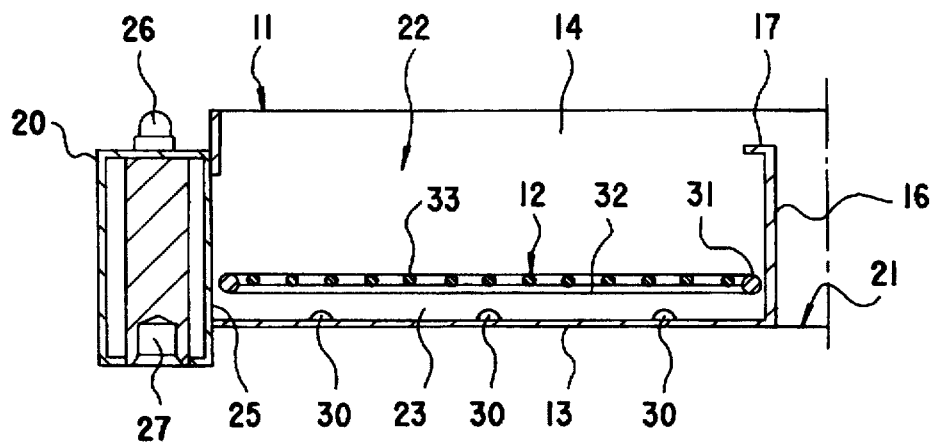
FIG. 9 is a partial enlarged sectional view of the tray of FIG. 6.

The bottom 13 of the tray body 11 is provided with ribs 23 at a plurality of places along the shorter sides to support the support shelves 12 somewhat above the level of the bottom 13. Each oil feed pipe 20 is provided with plurality of bosses 24 (in the figure, 4 bosses) formed on its outer side with an oil feed port 15 and on its inner side with a plurality of slits 25 extending substantially throughout the length along the loner sides to allow oil to flow in through said slits. The slits 25 are located below the level of the support shelf 12. The oil feed pipe 20 has on its upper surface positioning pins 26 projecting therefrom to serve for positioning when trays are stacked one upon another and its lower surface positioning holes 27 formed therein to receive the positioning pins 26 (FIG. 9). Further, the upper and lower surfaces of the oil feed pipe 20 are formed with oil discharge holes 28 for discharging the oil in the oil feed pipe 20 (FIG. 8).

The lower end portion of the weir 16 of the tray body 11 is formed with a plurality of drain ports 29 for oil to flow therethrough, so that upon completion of cooking, the oil in the receiving space 22 can be discharged to the last drop. The drain ports 29 are sufficiently smaller than the slits 25 in the oil feed pipe 20 to ensure that the amount of oil discharged from the drain ports 29 is sufficiently smaller than the amount of oil fed from the slits 25. Further, the lower ends of the ribs 23 are formed with communication holes 30 so that oil flows through the communication holes 30 to spread over the bottom 13.

Figure 12:
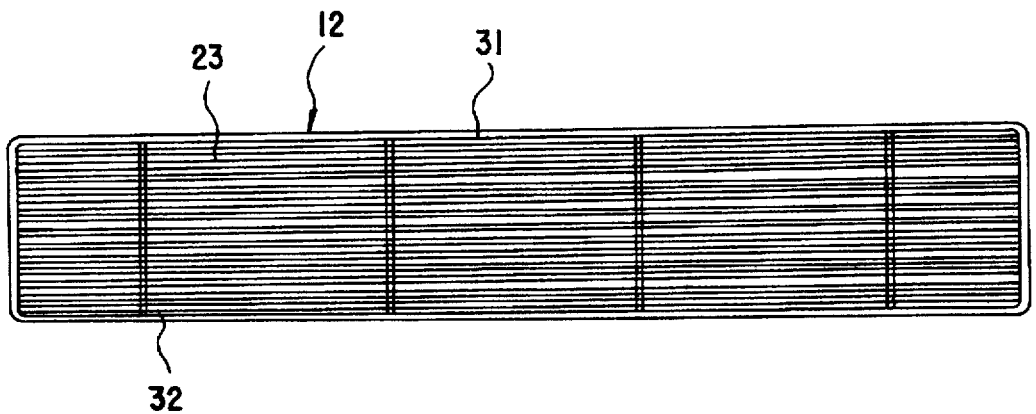
FIG. 12 is a plan view of a support shelf in the tray of FIG. 6.
Figure 13:
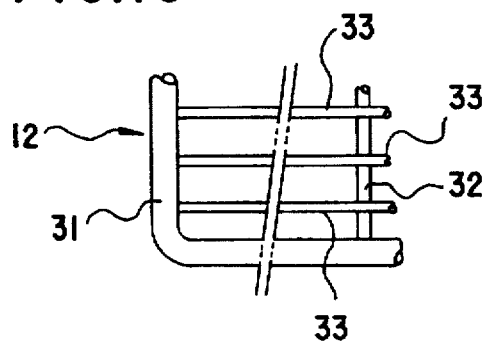
FIG. 13 is a partial enlarged plan view of the support shelf of FIG. 12.
Figure 14:
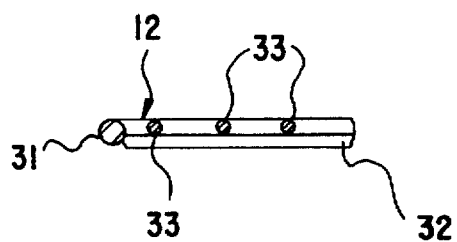
FIG. 14 is a partial enlarged sectional view of the support shelf of FIG. 12.

The support shelf 12, as shown in FIGS. 12 through 14, comprises a rectangular outer frame 31 having a size to be received in the receiving space 22 of the tray body 11, said outer frame 31 having attached thereto a plurality of support bars 32 along the shorter sides, and a plurality of mounting bars 33 along the longer sides placed on said support bars 32. The spacing between two adjacent mounting bars 33 is such that food to be cooked does not fall therethrough, the opposite ends of the support bars 32 and mounting bars 33 being welded to the inner side of the outer frame 31.

Further, the tray body 11 and support shelf 12 which constitute the tray 10 are coated with polytetrafluoroethylene (TEFLON). This polytetrafluoroethylene (TEFLON) coating prevents seizure of material to both the tray body 11 and the support shelf 12, and even if it seizes, the coating facilitates the removal thereof. This type of Teflon coating is also applied to the trays 10 shown in FIG. 3 described previously and to the tray 10 shown in FIG. 29 to be later described.

Figure 15:
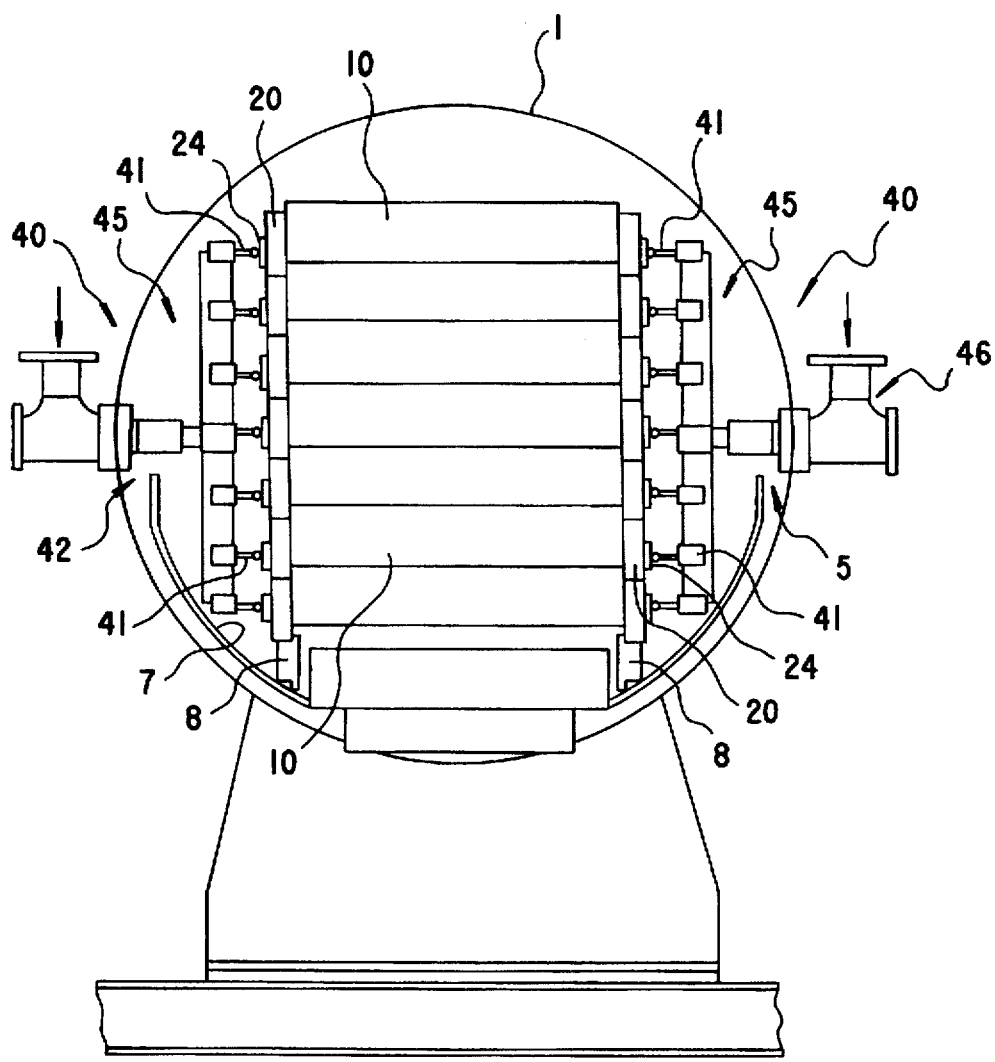
FIG. 15 is a front view showing outlines of another embodiment of a fried food producing apparatus according to the present invention.

A plurality of trays 10 shown in FIG. 6 are stacked and received in the processing tank 1, and the oil feed nozzles 41 of the oil feed device 40 are disposed on opposite sides of the trays 10. The oil feed device 40 comprises oil feed nozzles 41 corresponding to the oil feed ports 15 of the trays 10, and a nozzle driving device 42 for moving them back and forth. In addition, the producing apparatus shown in FIG. 15 is arranged to carry in and out the trays 10 stacked in the processing tank 1 by guide rollers 8.

Figure 16:
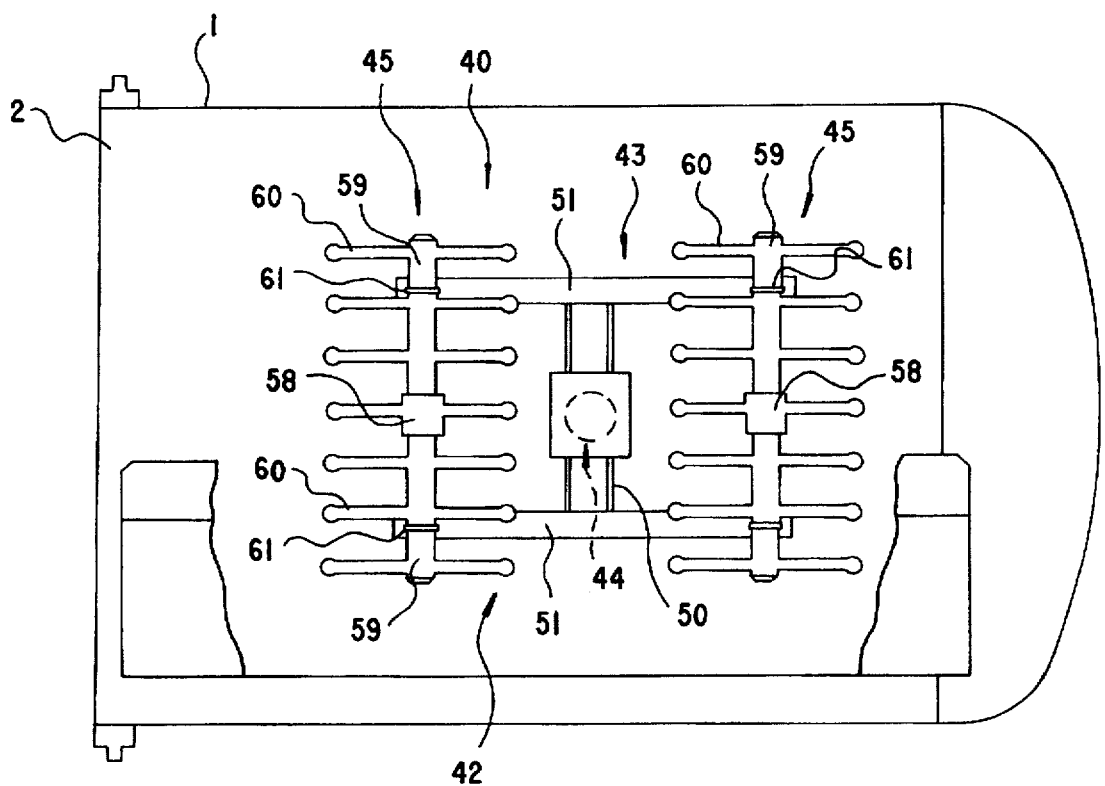
FIG. 16 is a side view of an oil feed device in the producing apparatus of FIG. 15.

The nozzle driving device 42 of the oil feed device 40, as shown in FIG. 16 comprises an H-shaped support frame 43 opposed to the side surfaces of the trays 10 in the processing tank 1, a slide device 44 for slidably supporting the support frame 43 to slide the latter horizontally toward and away from the trays 10, a pair of headers 45 supported by the support frame 43, and header nozzles 46 for feeding oil to the header 45, with oil feed nozzles 41 attached to said header 45.

Figure 17:
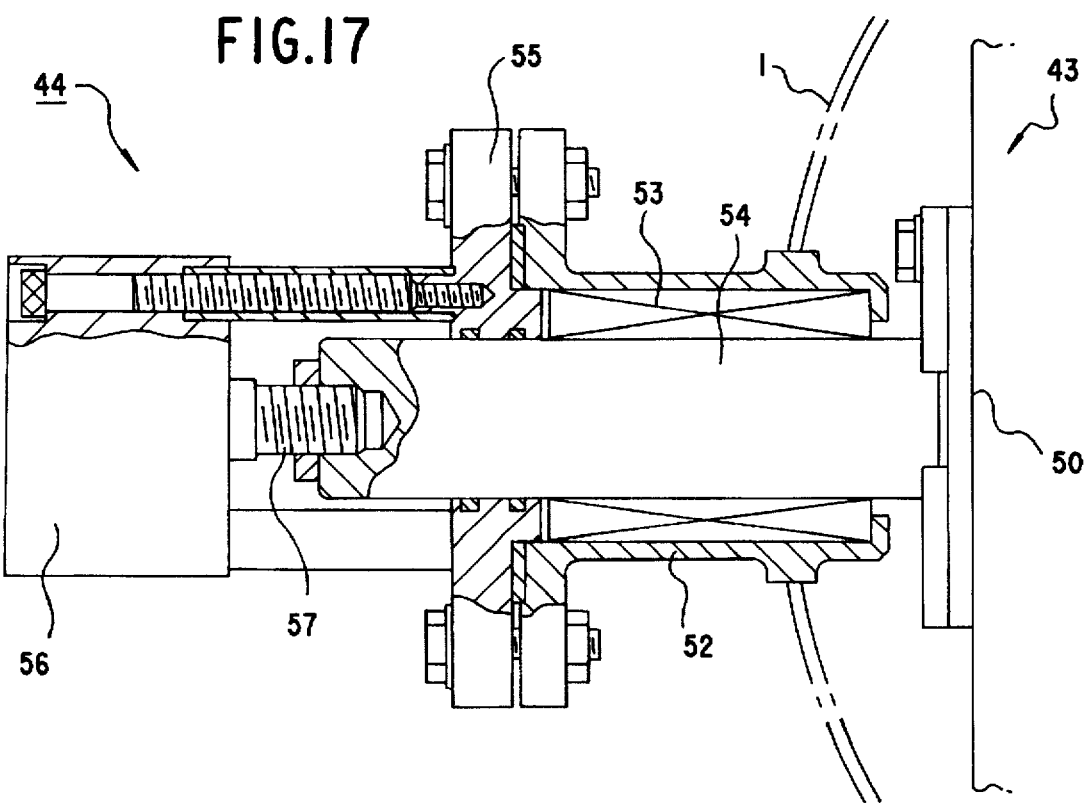
FIG. 17 is a partial enlarged sectional view of a slide device in the oil feed device of FIG. 16.

The support frame 43 has a central vertical support pillar 50, and horizontal arms 51 extending lengthwise of the processing tank 1 from tis upper and lower ends. The slide device 44, as shown in FIG. 17, comprises a first casing 52 having a front end extending into and fixed to the processing tank 1, a shaft 54 slidably supported on the first casing 52 through a bush 53, a second casing 55 bolted to the rear end of the first casing 52, and a cylinder 56, such as an air cylinder, bolted to the second casing 55. The piston rod 57 of the cylinder 56 is connected to the rear end of the shaft 54, while the front end of the shaft 54 is connected substantially to the middle of the support pillar 50 of the support frame 43, so that when the cylinder 56 is extended or contracted, the support frame 43 is slid radially inwardly or outwardly of the processing tank 1.

Each of the headers 45 supported by the support frame 43 comprises a centrally located joint portion 58, pipe portions 59 communicating with the joint portion 58 and extending vertically from the upper and lower surface of the joint portion 58, and branch pipes 60 horizontally branching from the pipe portions 59. The pipe portions 59 are fixed to the front ends of the arms 51 of the support frame 43 through U-shaped brackets 61, whereby the headers 45 are fixed to the support frame 43.

Figure 18:
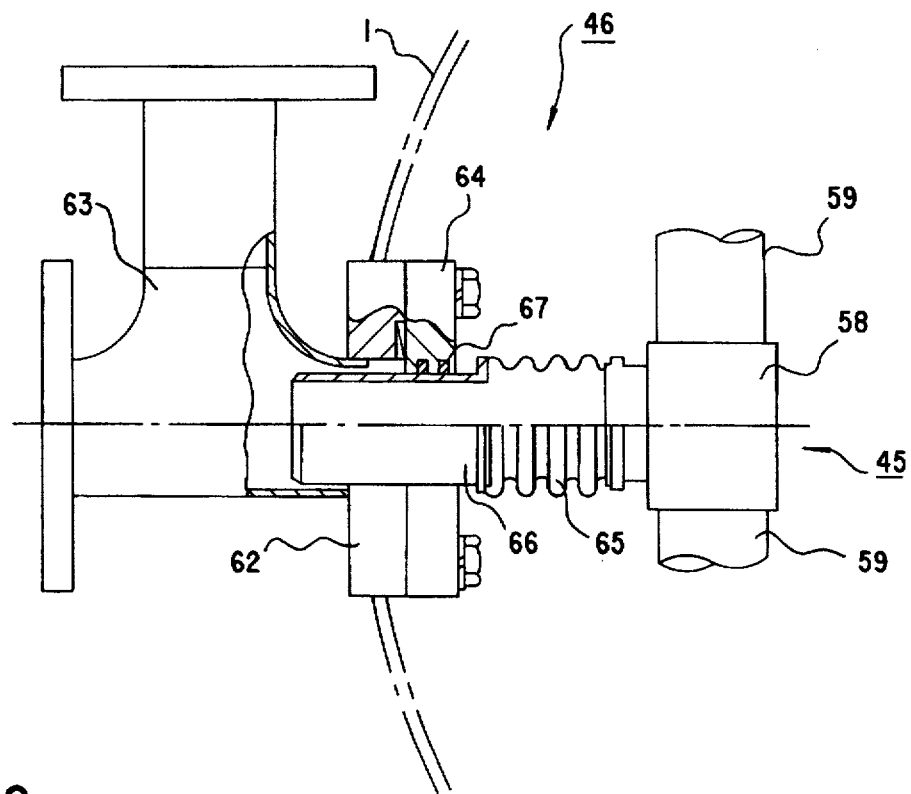
FIG. 18 is a partial enlarged sectional view of a header nozzle in the oil feed device of FIG. 16.

The header nozzle 46 for feeding oil to the associated header 45, as shown in FIG. 18, comprises a nozzle body 63 whose flange 62 is fixed to the processing tank 1, a guide ring 64 bolted to the flange 62 of the nozzle body 63, and a connecting sleeve 66 whose rear end extends through the guide ring 64 to communicate with the nozzle body 63, whose middle portion has a metal bellows 65 and whose front end is fixed to and communicates with the joint portion 58 of the header 45. The inner peripheral surface of the guide ring 64 has O-rings 67 force-fitted therein for pressure contact with the outer peripheral surface of the rear end portion of the connecting sleeve 66, it being arranged that under the action of the O-rings 67, the connecting sleeve 66 axially slides while it is in communication with the nozzle body 63.

Figure 19:
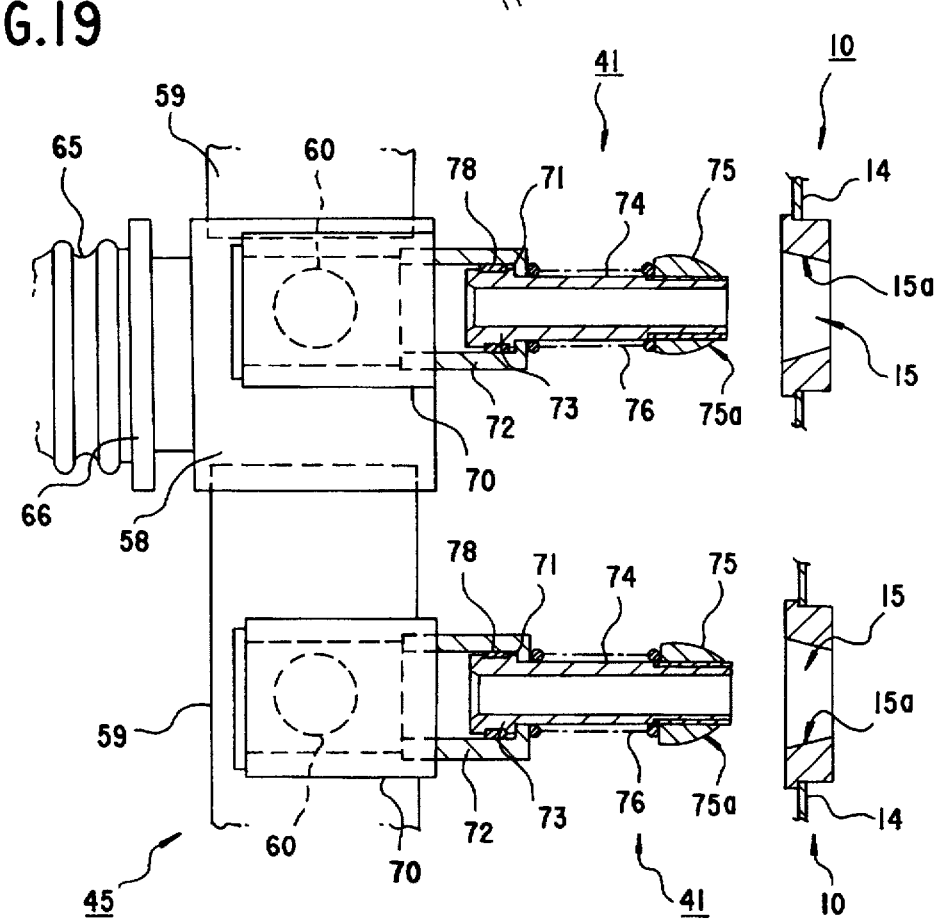
FIG. 19 is a partial enlarged sectional view showing the positional relation between the oil feed nozzle and the oil fed port in the tray in the oil feed device of FIG. 16.
Figure 20:
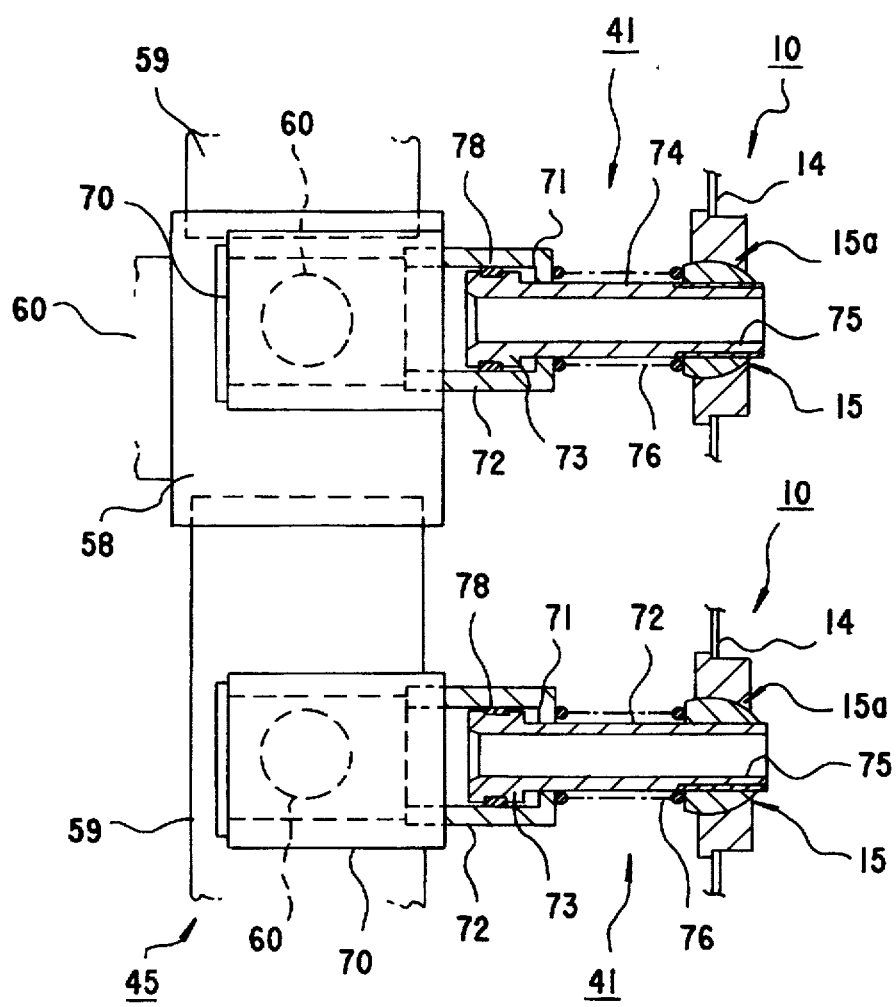
FIG. 20 is a partial enlarged sectional view showing the positional relation between the oil feed nozzle and the oil feed port in the tray in the oil feed device of FIG. 16.

Each of the oil feed nozzles 41 fixed to the front ends of the branch pipes 60 of the header 45, as shown in FIG. 19, comprises a base portion 70 communicating with and fixed to the front end of the branch pipe 60, a support sleeve 72 threadedly fitted in the front end of the base portion and having a step 71 on the front inner peripheral surface, a slide sleeve 74 whose rear end large diameter portion 73 is slidably inserted in the support sleeve 72 and whose front end projects forwardly of the support sleeve 72, and a guide member 75 threadedly fitted on the front outer peripheral surface of the slide sleeve 74, and a spring 76 compressed between the front end surface of the support sleeve 72 and the rear end surface of the guide member 75. The slide sleeve 74 is constantly urged forward by the elastic force of the spring 76 and normally is at rest as the larger diameter portion 73 of the slide sleeve 76 abuts against the step 77 of the support sleeve 72.

Further, the outer peripheral surface of the guide member 75 at the front end of the oil feed nozzle 41 is a spherical surface 75a with a reduced diameter on the front side, and correspondingly thereto, the inner peripheral surface of the oil feed port 15 of the side wall 14 of the tray 10 is a taper surface 15a with a smaller diameter on the inner side. Further, O-rings 78 are force-fitted between the outer peripheral surface of the larger diameter portion 73 of the slide sleeve 74 and the inner peripheral surface of the support sleeve 72.

The oil feed device 40 shown in FIG. 15 operates as follows. Stacked trays 10 are carried into the processing tank 1 and the latter is tightly closed, whereupon the slide device 44 is operated to advance the support frame 43. This advance movement, as shown in FIG. 19, causes the front ends of the oil feed nozzles 41 of the headers 45 to fit in the oil feed ports 15 of the trays 10. At this time, since the front ends of the slide sleeves 74 of the oil feed nozzles 41 have fixed thereto the guide members 75 having spherical surfaces adapted to extend along the taper surfaces of the oil feed ports 15, and since the slide sleeves 74 are elastically supported by the springs 76, the guide members 75 at the front ends of the slide sleeves 74 are reliably elastically air-tightly fitted in the oil feed ports 15.

Further, when the support frame 43 is advanced by the slide device at, the intermediate portion of the connecting sleeve 66 of the header nozzle 46 is formed with the bellows 65 to provide some flexibility to the connecting sleeve 66. Since the header 45, integral with the support frame 43, is turnable to some extent around the axis of the shaft 54 of the slide device 44, positional deviation, if any, between the header 45 and the trays 10 can be absorbed by the rotative action of the header 45, so that the oil feed nozzles 41 can b reliably fitted in the oil feed ports 15.

Figure 21:
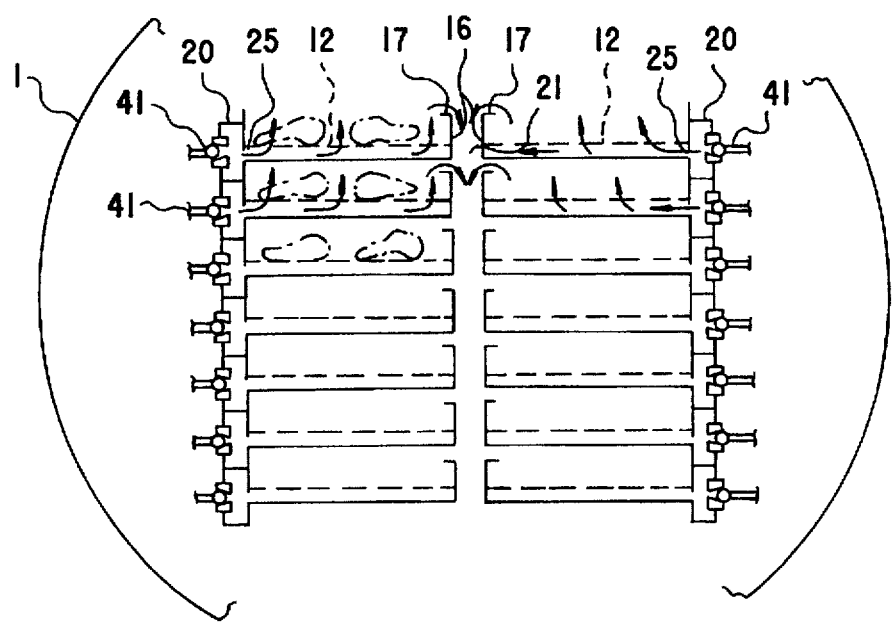
FIG. 21 is a schematic front view for explaining the oil feed movement inside the trays of the producing apparatus of FIG. 15.

When the oil feed nozzles 41 are fitted in the oil feed ports 15, oil is fed from the oil feed nozzles 41 into the trays 10. This feeding of oil is effected in the manner shown in FIG. 21. That is, oil from the oil feed nozzles 41 once fills the oil feed pipes 20 of the tray body 11 and flows from the slits 25 into the receiving spaces 22, then spreading between the bottoms 13 and the support shelves 12, passing through the support shelves 12 to fill the receiving spaces 22, overflowing the weirs 16 to flow down through the oil discharge holes 21. The articles of food on the support shelves 12 are cooked by the oil which fills the receiving spaces 22 and flow. The oil once filled into the oil feed pipes 20 is spouted through the slits 25 into the receiving spaces 22; therefore, oil can be uniformly rapidly charged into the receiving spaces 22, ensuring uniform cooking. The oil flowing through the oil discharge holes 21 in the trays 10 is prevented by the baffle plates 17 on the weirs 16 of lower trays 10 from entering the receiving spaces 22 of lower trays 10; thus, discharger of oil from the trays 10 is reliably effected.

Figure 11:
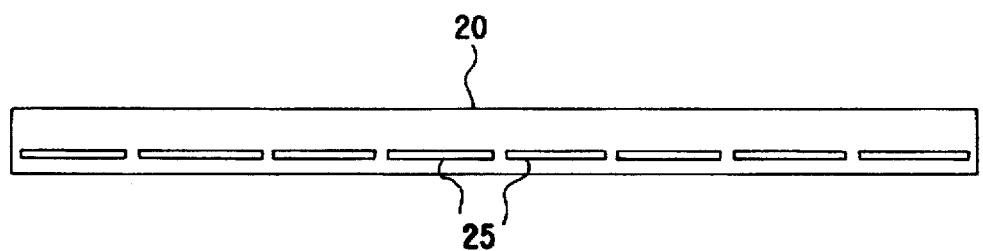
FIG. 11 is a front view showing the inner side of an oil feed pipe for the tray body of FIG. 10.
Figure 22:
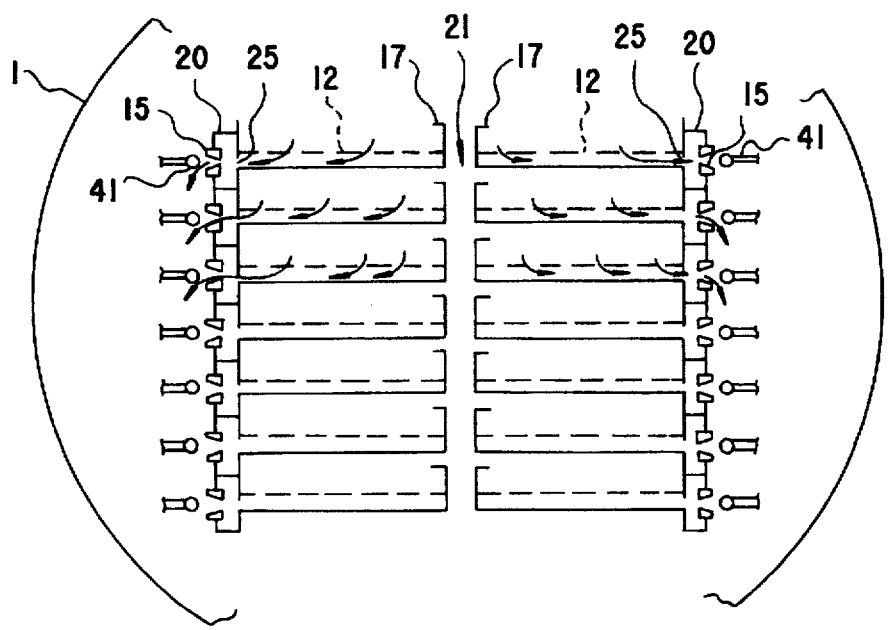
FIG. 22 is a schematic front view for explaining the oil feed discharge movement of the producing apparatus of FIG. 15.

Upon completion of cooking, the feeding of oil from the oil feed nozzles 41 is stopped, and at the same time the support frame 43 is retracted by the slide device 44, separating the oil feed nozzles 41 from the oil feed ports 15 of the trays 10. As a result, as shown in FIG. 22, the oil feed ports 15. As a result, as shown in FIG. 11, the oil feed ports 15, now rendered oil discharge ports by the separation of the oil feed nozzles 41, allow rapid discharge of the oil from the receiving spaces 22 and oil feed pipes 20.

Modifications of the oil feed nozzle 41 and tray 10 in the above embodiment will now be described with reference to FIGS. 23 through 28.

Figure 23:
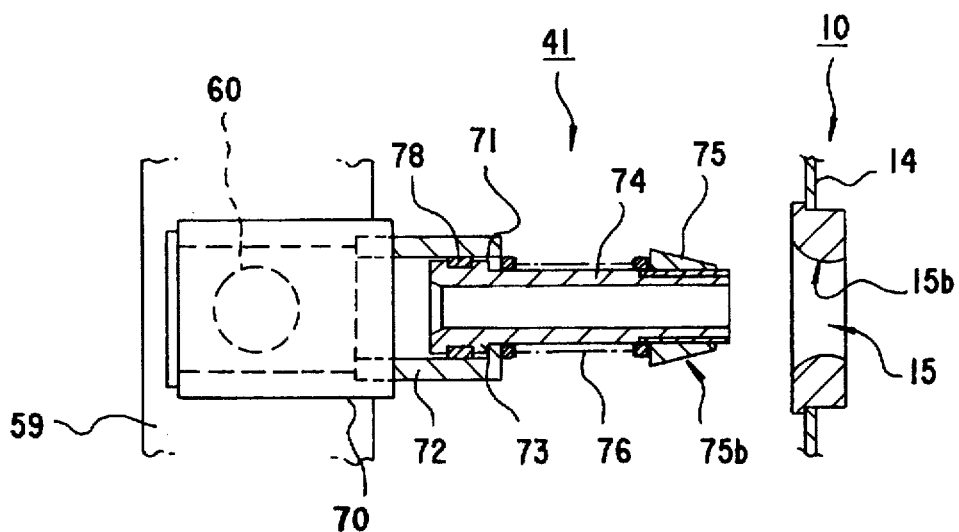
FIG. 23 is a partial enlarged sectional view showing the positional relation between the oil feed nozzle and the oil feed port in the tray according to another embodiment in the oil feed device of FIG. 16.

In FIG. 23, the outer peripheral surface of the guide member 75 provided at the front end of the oil feed nozzle 41 is in the form of a taper surface 75b which is reduced in diameter on its front side, while the inner peripheral surface of the oil feed port 15 of the corresponding tray 10 is a spherical surface 15b. In this case also, the engagement between the taper surface and the spherical surface enables the oil feed nozzle 41 and the oil feed port 15 to be reliably fitted together.

Figure 24:
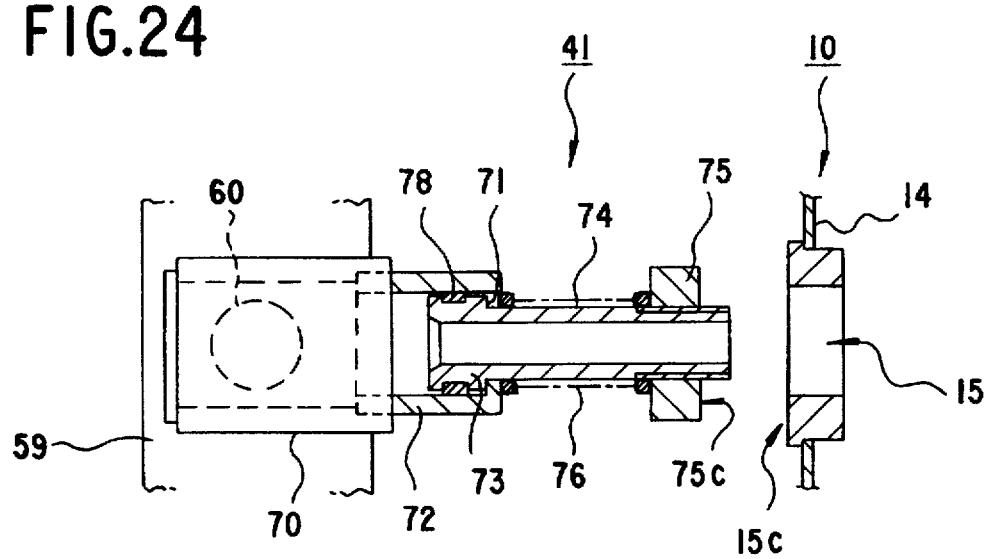
FIG. 24 is a partial enlarged sectional view showing the positional relation between the oil feed nozzle and the oil feed port in the tray according to another embodiment in the oil feed device of FIG. 16.

Further, the oil feed nozzle 41 of FIG. 24 has an annular guide member 75 having a larger diameter than the oil feed ports 15 of the trays 10 and fixed on the outer peripheral surface of the slide sleeve 74 somewhat inwardly of the front end thereof, while the oil feed port 15 of the tray 10 has an axially straight cylindrical surface. In this case, the front end of the slide sleeve 74 is inserted into the oil feed port 15 until the front surface 75c of the annular guide member 75 is pressed against the opening outer peripheral surface 15c of the oil feed port 15, whereby fluid tightness is secured therebetween.

Figure 25:
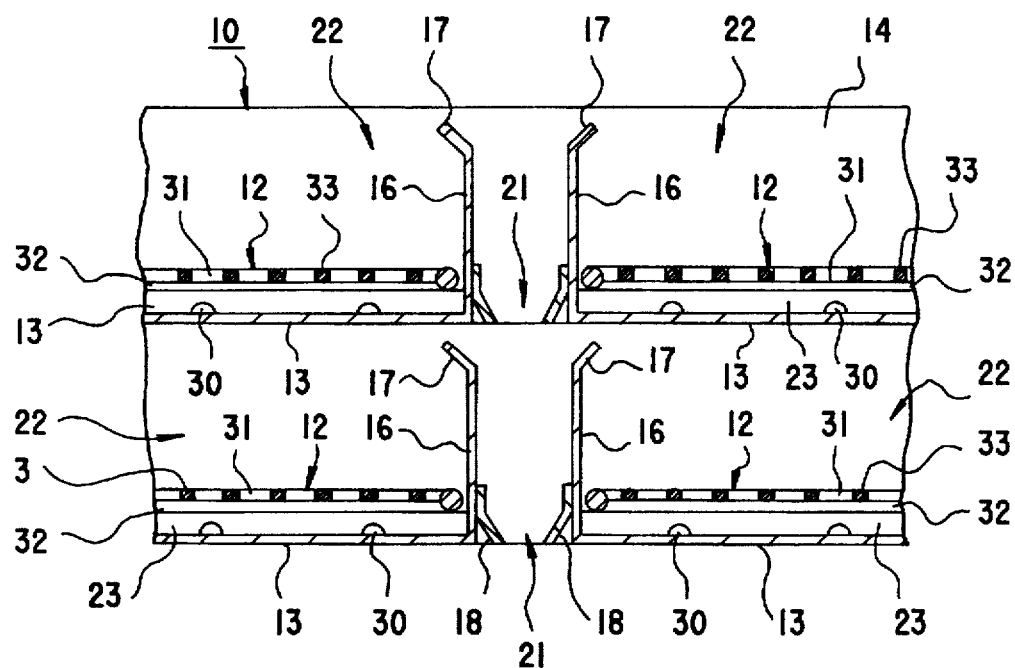
FIG. 25 is a partial sectional view showing another embodiment of a tray in the producing apparatus of FIG. 16.
Figure 26:
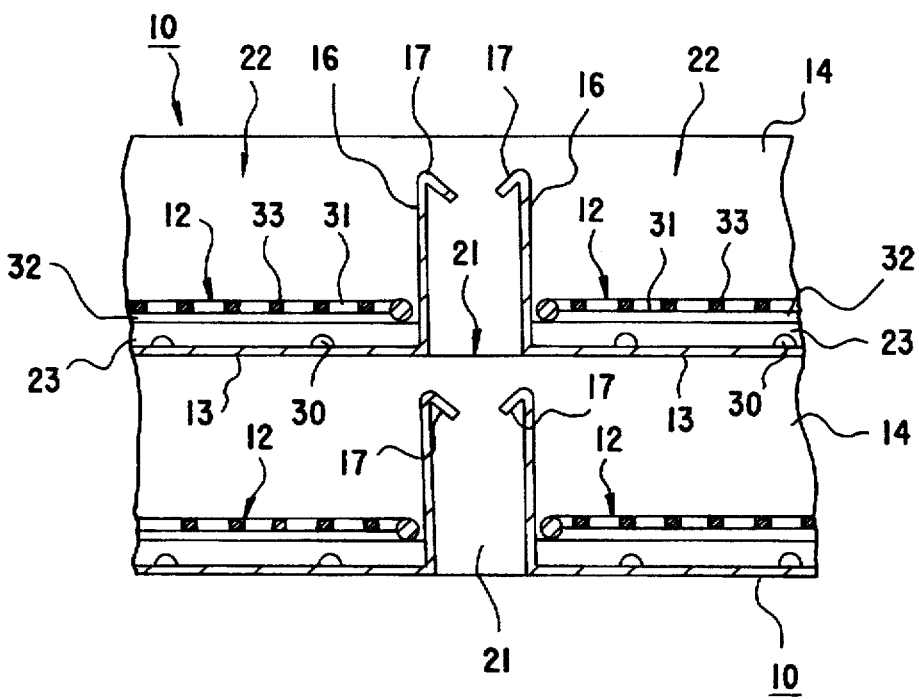
FIG. 26 is a partial sectional view showing another embodiment of a tray in the producing apparatus of FIG. 16.

FIG. 25 shows that the baffle plates 17 formed on the upper ends of the weirs 16 of the trays 10 are inclined from the upper ends of the weirs 16, not horizontally but obliquely upward, over the receiving spaces 22. This inclined arrangement of the baffle plates 17 prevents the oil flowing down from upper rays from entering the receiving spaces 22 and smooths the overflowing of the oil from the receiving spaces 22. Further, as shown in FIG. 25, the lower portions of the inner surfaces of the weirs 16 facing the oil discharge hole 21 may be integrally provided with guide elements 18 whereby the oil flowing down the oil discharge holes 21 is guided toward the middle of the oil discharge hole 21. The guide elements 18 force the oil to flow toward the middle of the oil discharge hole 21; therefore, the discharge of oil can be effected smoothly and reliably. Further, as shown in FIG. 26, the baffle plates 17 of the weirs 16 of the tray 10 may be inclined obliquely downward toward the oil discharge hole 21.

Figure 27:
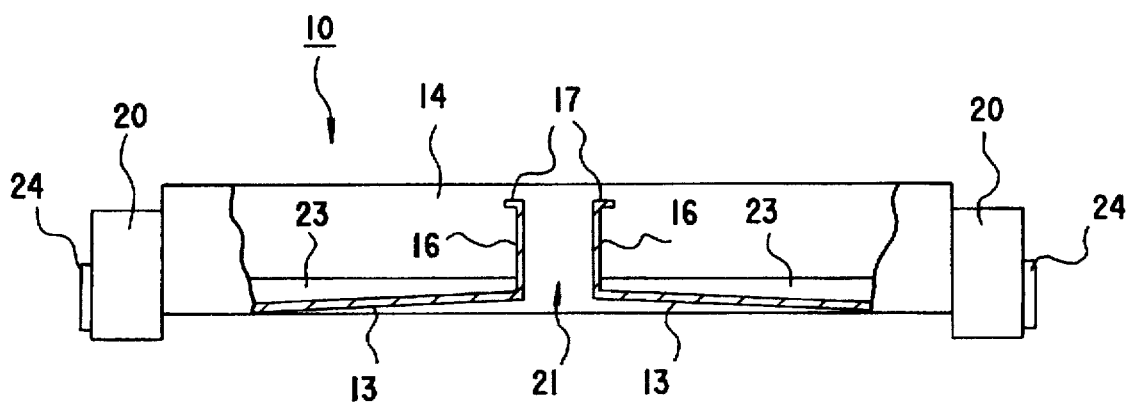
FIG. 27 is a partial sectional view showing another embodiment of a tray in the producing apparatus of FIG. 16.

Further, besides being horizontal, the bottom 13 of the tray 10 may be inclined, as shown in FIG. 27, such that the side of the bottom 13 associated with the oil feed pipe 20 is at a lower level to attain more effective discharge of oil after cooking. In this case, the height is adjusted such that the upper surfaces of the plurality of ribs 23 are horizontal, the support shelves 12 being horizontally placed on the ribs 23.

Figure 28:
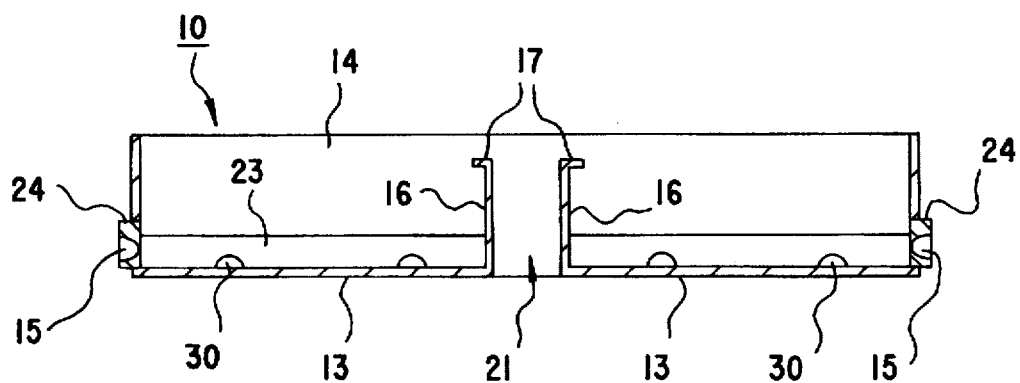
FIG. 28 is a partial sectional view showing another embodiment of a tray in the producing apparatus of FIG. 18.

A different tray 10 may also be used which has no oil feed pipes on opposite sides. For example, the side wall 14 of a pan-like tray body 11 as shown in FIG. 28 may have directly attached thereto bosses 24 formed with oil feed ports 15. Further, trays 10 shown in FIGS. 29 through 33 are also applicable.

Figure 31:
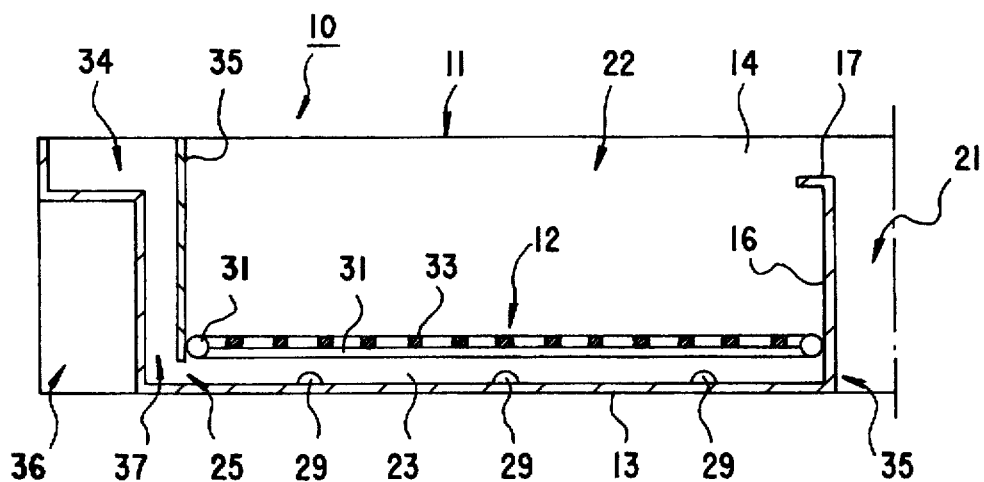
FIG. 31 is a partial enlarged sectional view of the tray of FIG. 29.
Figure 32:
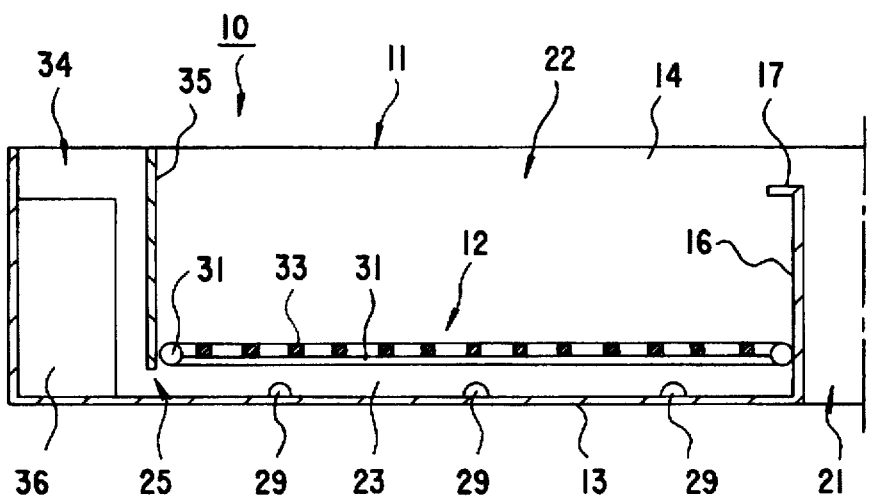
FIG. 32 is a partial enlarged sectional view of the tray of FIG. 29.
Figure 33:
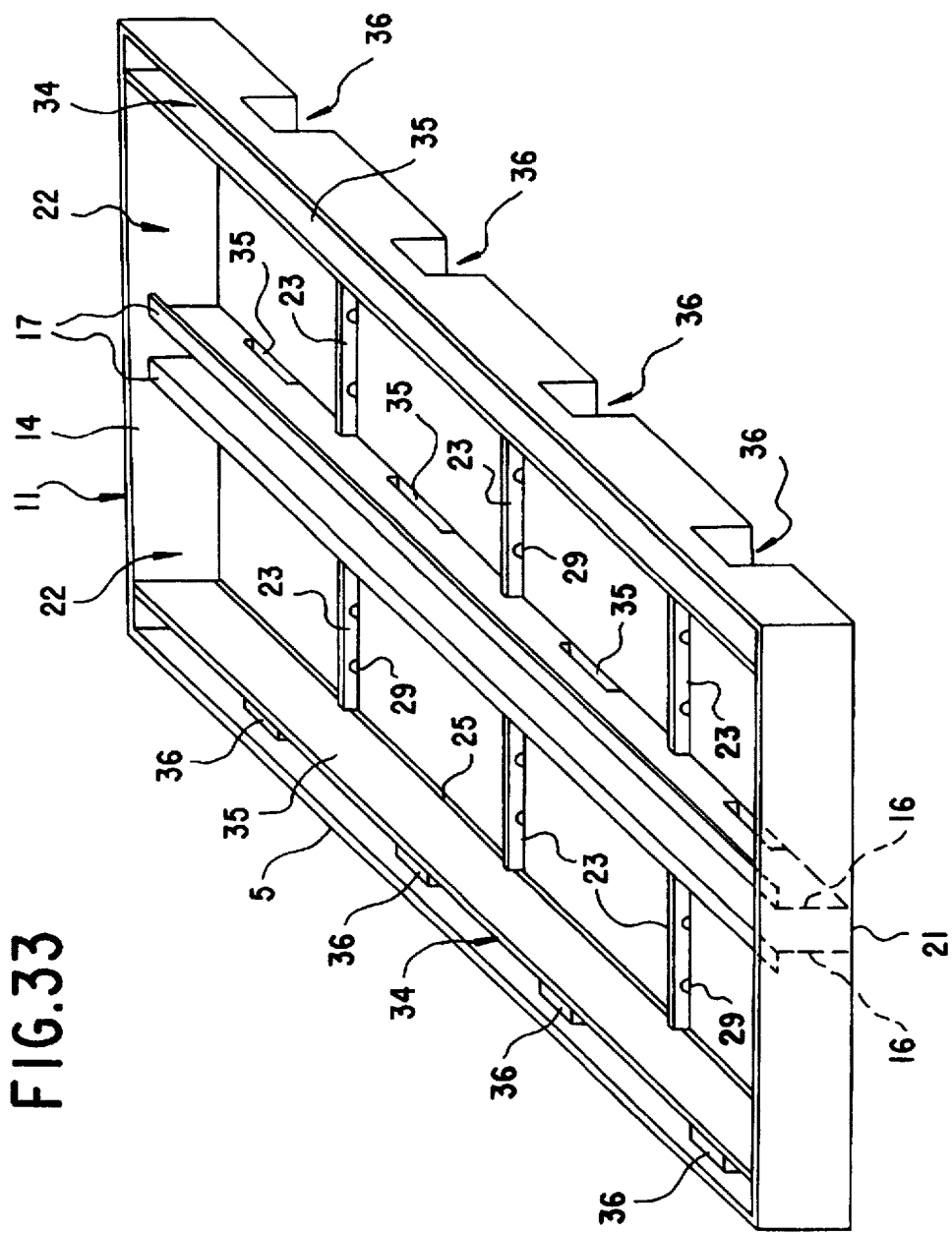
FIG. 33 is a perspective view of a tray body in the tray of FIG. 29.

A major difference of the trays 10 shown in FIGS. 29 through 33 from the tray 10 shown in FIG. 6 is that oil feed grooves 34 are formed on opposite sides of the rectangular pan-like tray body 11, the arrangement of other than the oil feed grooves 34 being the same as in the tray 10 of FIG. 6. The tray 10 of FIG. 29 has oil discharge grooves 34 defined by the side wall 14 on opposite sides of the tray body 11 and partition plates 35 opposed thereto in the vicinity of the inner side. Further, a plurality of recesses 36 for receiving the front ends of the oil feed nozzles 41 are formed in the lower portion of the side wall 14, with communication passages 37 defined between the recesses 36 and the partition plates 35 to keep the oil feed grooves 34 from being divided (FIG. 31).

The lower ends of the weirs 16 on opposite sides of the oil discharge 21 formed centrally and longitudinally of the tray body 11 are formed with oil discharge slits 38 extending longitudinally of the weirs 16, so that rapid discharge of the oil in the receiving spaces 22 upon completion of cooking can be effected until the last drop of oil in the receiving spaces 22 is discharged.

Figure 29:
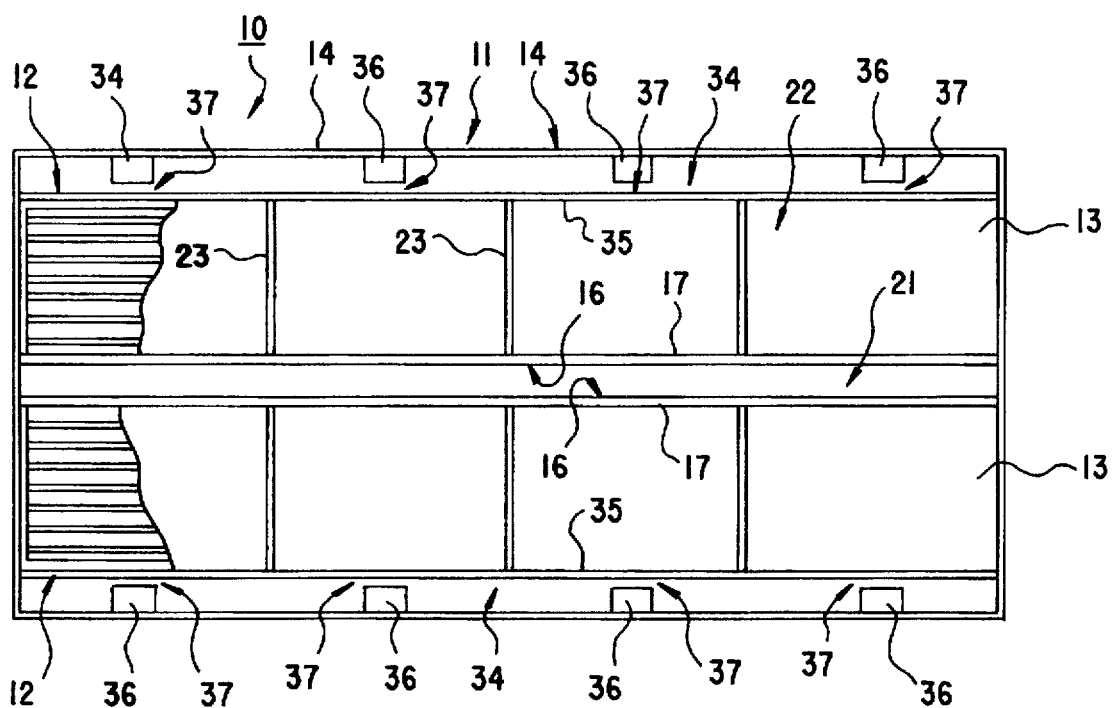
FIG. 29 is a plan view showing another embodiment of a tray for producing fried food according to the invention.
Figure 30:
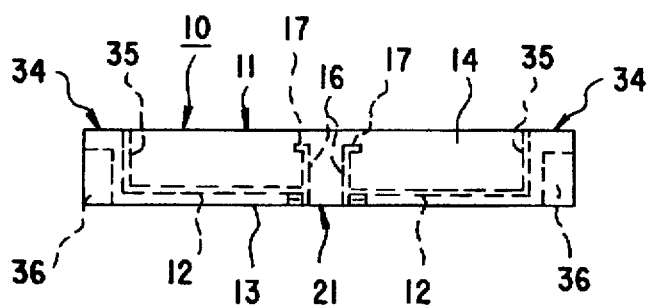
FIG. 30 is a front view of the tray of FIG. 29.
Figure 34:
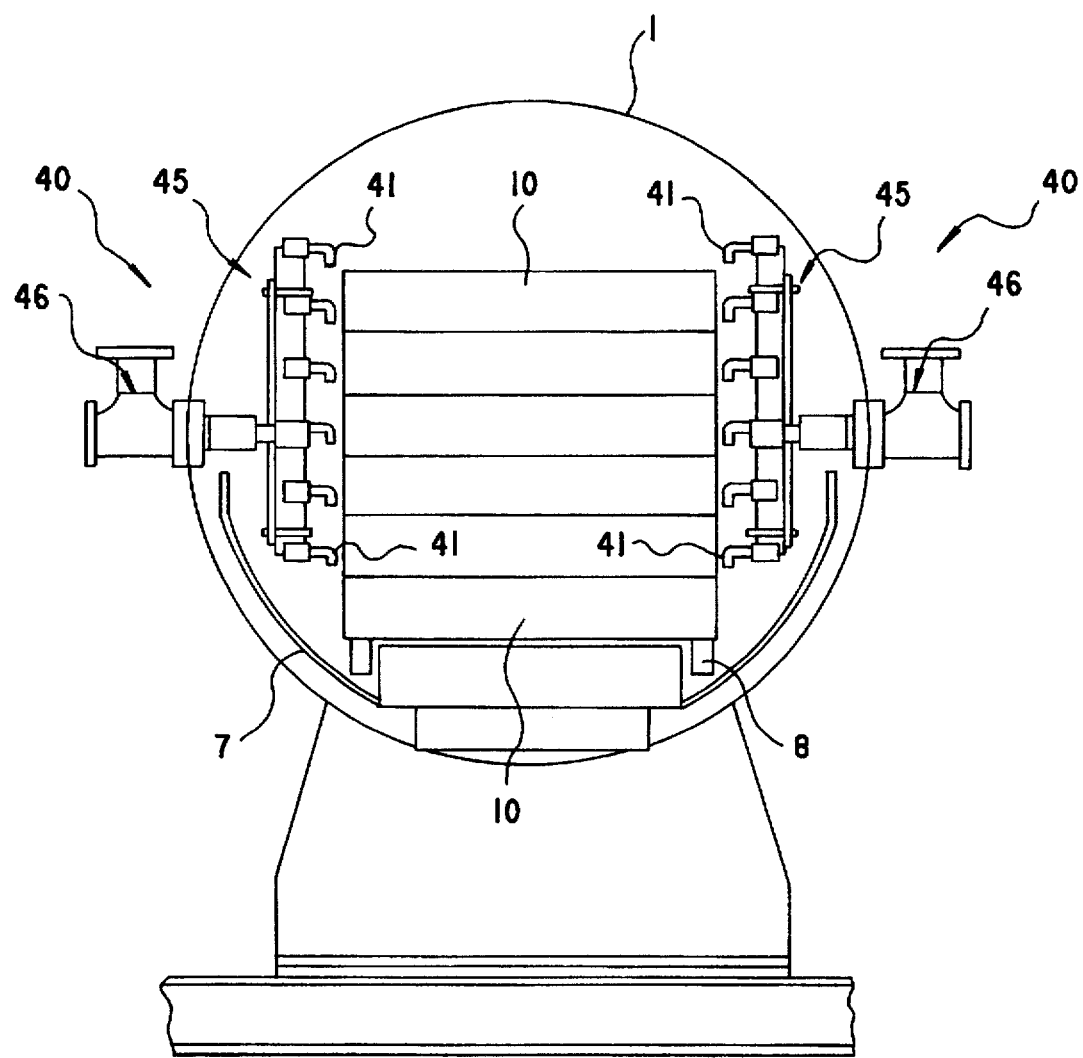
FIG. 34 is a front view showing outlines of a fried food producing apparatus according to the invention using the tray of FIG. 29.
Figure 35:
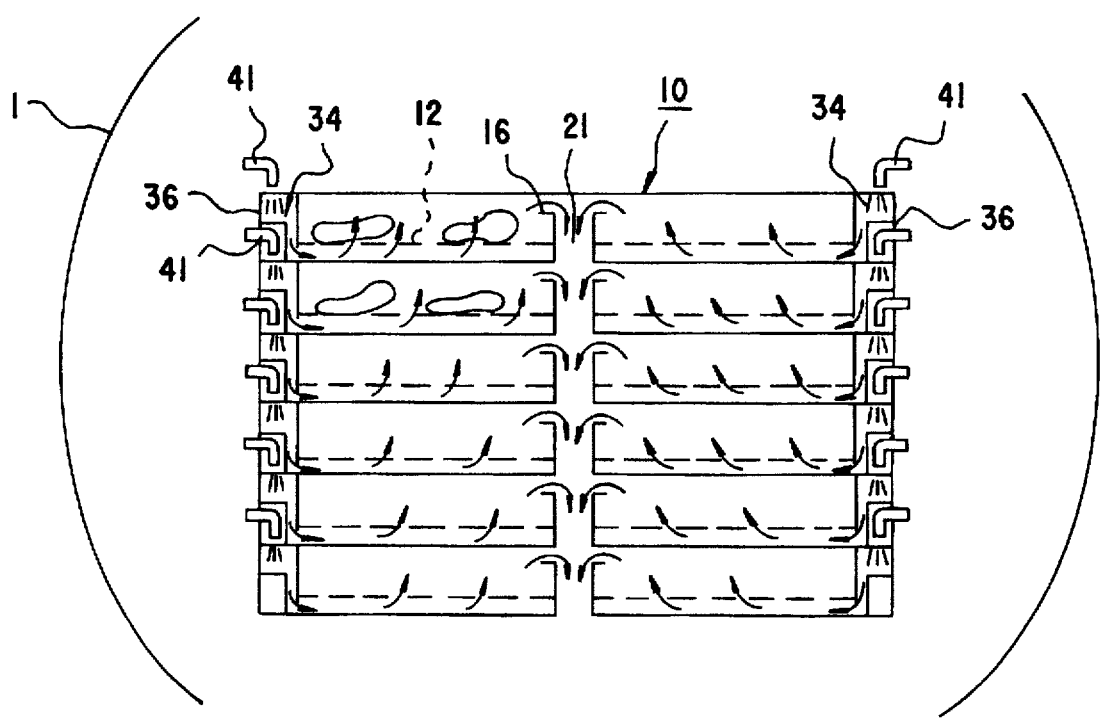
FIG. 35 is a schematic front view for explaining the oil feed movement in the trays of the producing apparatus of FIG. 34.

In the case of the tray 10 in FIG. 29, a plurality of such trays are stacked and received in the processing tank 1 as shown in FIG. 34. Correspondingly to this tray 10, an oil feed device 40 is used whose oil feed nozzles 41 have their front ends bent downward. When the oil feed nozzles 41 are advanced by the slide device 44 of the oil feed device 40, the downwardly directed front ends of the oil feed nozzles 41 are inserted into the recesses 36 in the trays 10, as shown in FIG. 35. In this state, when oil is poured from the oil feed nozzles 41, it once fills the oil feed groove 34 and then flows out of the oil feed slits 25 into the receiving space 22 to fill the latter and overflows the weir 16, flowing down through the oil discharge hole 21. When cooking is completed, the feeding of the oil by the oil feed nozzles 41 is stopped, and the oil feed nozzles 41 are retracted by the slide device 44 to separate the oil feed nozzles 41 from the recesses 36 of the trays 10. Thereby, the oil in the receiving space 22 is rapidly discharged through the oil discharge slits 38 in the lower end of the weir 16.

Figure 36:
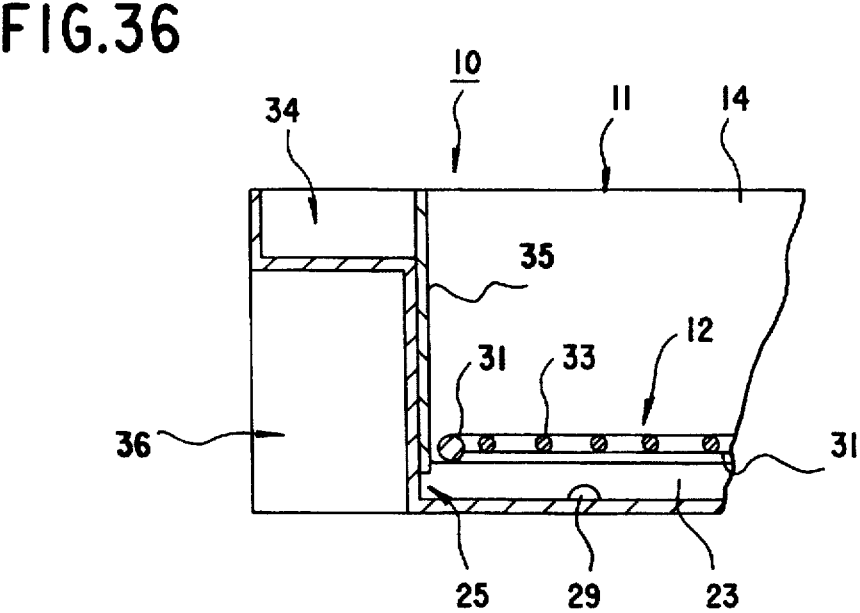
FIG. 36 is a partial enlarged sectional view showing a modification of the tray of FIG. 29.

The recesses 36 formed in the oil feed groove 34 in the tray body 11 are designed not to divide the oil feed groove 34; however, if the amount of oil being fed is so large that there is no problem even if the oil feed groove 34 is divided, the recesses 36 may be extended to the partition plate 35, as shown in FIG. 36.

What is claimed is:

1. A method of producing fried food comprising the steps of: receiving food in at least one closed bottom cooking tray; placing the at least one cooking tray in a processing tank; charging and maintaining a flow of heated cooking oil at a given flow rate laterally into and across the at least one cooking tray immersing the food in the oil for frying the food while allowing the oil to overflow a side of the cooking tray; and discharging the oil from the tray upon the lapse of a predetermined immersing time.

2. A method of producing fried food as set forth in claim 1, wherein the discharge of oil is effected by removing an oil feed nozzle disposed to be fitted in and removed from an oil feed port formed in a side wall of the tray adjacent the bottom thereof from the tray upon the lapse of said predetermined immersing time whereby the heated oil charged into the tray in an overflowing state is discharged through the oil feed port of the tray.

3. A fried food producing apparatus comprising: a tightly closeable processing tank having an inlet and outlet opening formed in a side thereof; a cover closing said opening; a plurality of food receiving, closed bottom cooking trays stacked and substantially horizontally disposed in the processing tank; oil feed nozzles disposed laterally of and in fluid communication with the respective trays for charging heated cooking oil at a given flow rate into the trays and immersing the food in the heated oil for frying the food; and an oil feed device having a nozzle driving device for slidably supporting said nozzles and mounting said nozzles on and dismounting said nozzles from the trays.

4. A fried food producing apparatus as set forth in claim 3, wherein the trays have side walls facing an inner wall of said processing tank and the nozzle driving the oil feed device comprises a support frame supported in the processing tank in opposed relation to the side walls of the trays in the processing tank, a slide device for supporting said support frame for forward and backward slide movement toward and away from the trays, a header having oil feed nozzles supported by said support frame, and a header nozzle for feeding oil to said header.

5. A fried food producing apparatus as set forth in claim 4, wherein the header nozzle comprises a nozzle body whose flange is fixed to the processing tank, a guide ring joined to the flange of said nozzle body and having an O-ring mounted in the inner peripheral surface thereof, and a connecting sleeve whose rear end extends through the guide ring to slidably communicate with the nozzle body, whose middle portion has a metal bellows and whose front end is fixed to and communicates with the header.

6. A fried food producing apparatus as set forth in claim 4, wherein the support frame is H-shaped having a pair of horizontal arms and a support pillar connecting said pair of arms at their middle portions, while the header supported by the support frame comprises a centrally disposed joint, a pipe communicating with and extending through the joint vertically of the latter and fixed at its front end to the arms of the support frame, and a branch pipe branching from the pipe to extend horizontally and having an oil feed nozzle connected to the front end thereof.

7. A fried food producing apparatus as set forth in claim 3, wherein the tray has an oil feed port in its side wall in which the oil feed nozzle is removably fitted, said oil feed nozzle comprising a base portion supported by a nozzle driving device, a slide sleeve whose rear end larger diameter portion is slidably inserted into the support sleeve and whose front end projects forwardly toward the support sleeve, a guide member fixed in the front outer peripheral portion of the slide sleeve, and a spring compressed between the front end surface of the support sleeve and the rear end surface of the guide member.

8. A fried food producing apparatus as set forth in claim 7, wherein either the outer peripheral surface of the guide member for the oil feed nozzle or the inner peripheral surface of the oil feed port of the tray is spherical surface and the other is a taper surface adapted to come into tight elastic pressure contact with said spherical surface.

9. A fried food producing apparatus as set forth in any of claim 3 through 8, wherein said apparatus has attached thereto one or more means selected form the group consisting of oil circulating means for purifying the cooking oil fed to the tray outside the processing tank by purifying means and reheating the oil to feed it to the oil feed device, gas feeding means enabling an inert gas such as nitrogen to be sealed in or conveyed under pressure into the processing tank, pressure adjusting means enabling the pressure in the processing tank to be increased or decreased by a pressure controller on the basis of detection signals from a pressure sensor detecting the pressure in the tightly closed processing tank, oil temperature adjusting means enabling the oil fed to the oil feed device to be heated or cooled by the temperature controller on the basis of detection signals from a temperature sensor which detects the temperature of the oil charged into the tray in the processing tank, oil feed amount adjusting means enabling the flow rate of oil being fed to the oil feed device by a flow rate controller on the basis of detection signals form a flow rate sensor which detects the flow rate of oil circulating between the processing tank and the oil feed device.

10. A fried food producing apparatus as set forth in any of claim 3 through 8, wherein said apparatus has attached thereto cooling means having a cooling pipe disposed in the processing tank and having cooling water circulated therein and allowing water vapor in the processing tank to settle thereon.

11. A fried food producing apparatus as set forth in any of claim 3 through 8, wherein a condensed water separating mechanism is installed in the processing tank for preventing condensed water adhering to the inner wall surface of the processing tank from dripping into the tray to mix with the oil in the tray.

12. A fried food producing apparatus having substantially rectangular, closed bottom cooking trays which receive food and are stacked in a processing tank, said apparatus comprising:

a plurality of trays each comprising an oil feed port formed in a side wall thereof adjacent the bottom for receiving an oil feed nozzle for charging heated oil into said tray, the oil feed nozzle being removably inserted from outside into said oil feed port so that when the oil feed nozzle is removed therefrom, said oil feed port serves as an oil discharge port, and a weir disposed on the side opposite to said side wall where said oil feed port is formed and arranged for the cooking oil charged into the tray to overflow said weir.

13. A fried food producing apparatus having substantially rectangular, closed bottom cooking trays which receive food and are stacked in a processing tank, said apparatus comprising:

a plurality of trays each comprising a tray body including an oil discharge port formed in a middle region of the bottom to extend along the longer sides of the tray; weirs disposed on opposite sides of said oil discharge port for the cooking oil to overflow said weirs; and oil discharge slit formed in the lower end of each weir; square oil feed pips extending along the longer sides of the tray bottom; oil feed ports formed in the outer surfaces of said oil feed pipes and shaped for oil feed nozzles to be removably inserted therein, and slits formed in the inner surfaces of aid oil feed pipes for allowing oil to flow into the tray bottom; and a support shelf having a number of openings through which oil passes and supported in the tray body at a level above said tray bottom.

14. A fried food producing apparatus having substantially rectangular, closed bottom cooking trays which receive food and are stacked in a processing tank, said apparatus comprising:

a plurality of trays each comprising a tray body including an oil discharge port formed in a middle region of the bottom to extend along the longer sides of the tray; weirs disposed on opposite sides of said oil discharge port for the cooking oil to overflow said weirs; an oil discharge slit formed in the lower end of each weir; oil discharge grooves extending along the longer sides of the tray bottom; oil feed slits formed in the lower regions of the inner surfaces of said oil feed grooves for feeding oil to the tray bottom, and recesses formed in the outer surfaces of said oil feed grooves for oil feed nozzles to fit therein; and a support shelf having a number of openings for oil to pass therethrough and supported in the tray body at a level above the bottom of the tray body.

15. A fried food producing apparatus as set forth in any of claim 12 through 14, wherein the weirs of the trays are formed with baffle plates for preventing the cooking oil flowing from upper trays from flowing into lower trays.

16. A fried food producing apparatus as set forth in any of claim 13 and 14, wherein the inner surfaces of the weirs of the tray body are formed with guide elements for guiding cooking oil to the middle of the discharge hole.

17. A fried food producing apparatus as set forth in any of claim 13 and 14, wherein the surfaces of all component of the trays are coated with polytetrafluoroethylene.

* * * * *